US010606008B2

(12) United States Patent
Claessens et al.

(10) Patent No.: US 10,606,008 B2
(45) Date of Patent: Mar. 31, 2020

(54) ENCLOSURE FOR USE IN A FIBER OPTIC DISTRIBUTION NETWORK

(71) Applicant: CommScope Connectivity Belgium BVBA, Kessel-Lo (BE)

(72) Inventors: Bart Mattie Claessens, Hasselt (BE); Emilie De Groe, Kessel-Lo (BE); Maarten Michiels, Herent (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/370,293

(22) Filed: Mar. 29, 2019

(65) Prior Publication Data

US 2019/0227249 A1    Jul. 25, 2019

Related U.S. Application Data

(62) Division of application No. 15/524,431, filed as application No. PCT/EP2015/075694 on Nov. 4, 2015, now Pat. No. 10,288,829.

(60) Provisional application No. 62/074,967, filed on Nov. 4, 2014.

(51) Int. Cl.
| | | |
|---|---|---|
| *G02B 6/44* | (2006.01) | |
| *F16J 15/06* | (2006.01) | |
| *F16J 15/08* | (2006.01) | |
| *H02G 15/013* | (2006.01) | |
| *H02G 15/007* | (2006.01) | |

(52) U.S. Cl.
CPC .......... *G02B 6/4446* (2013.01); *F16J 15/062* (2013.01); *F16J 15/0887* (2013.01); *G02B 6/4444* (2013.01); *G02B 6/4471* (2013.01); *H02G 15/007* (2013.01); *H02G 15/013* (2013.01)

(58) Field of Classification Search
CPC .... F16J 15/062; F16J 15/0887; G02B 6/4444; G02B 6/4446; G02B 6/4471; H02G 15/007; H02G 15/013; F01D 11/006
USPC ......................................................... 277/644
See application file for complete search history.

(56) References Cited

U.S. PATENT DOCUMENTS 3,472,523 A * 10/1969 Carlson, Jr. ............ F16J 15/024
                                                            277/649
5,313,546 A    5/1994 Toffetti
(Continued)

FOREIGN PATENT DOCUMENTS

DE            18 15 906 U      8/1960
DE     10 2008 032 572 A1      2/2010
(Continued)

OTHER PUBLICATIONS

International Search Report and Written Opinion of the International Searching Authority for corresponding International Patent Application No. PCT/EP2015/075694, dated May 9, 2016, 20 pgs.
(Continued)

*Primary Examiner* — Daniel Petkovsek
(74) *Attorney, Agent, or Firm* — Merchant & Gould P.C.

(57) ABSTRACT

The present disclosure relates to a re-enterable enclosure for a fiber optic network. The enclosure can include features such as a low compression-force perimeter gasket, cable seals constructed to seal effectively seal triple points, multi-function port size reducer plugs and multi-function blind plugs.

12 Claims, 34 Drawing Sheets

(56) References Cited

U.S. PATENT DOCUMENTS

| | | | |
|---|---|---|---|
| 5,351,973 A * | 10/1994 | Taniuchi | H01R 13/5205 |
| | | | 277/616 |
| 5,442,140 A | 8/1995 | McGrane | |
| 5,971,191 A | 10/1999 | Yamada et al. | |
| 6,003,878 A * | 12/1999 | Noble | F01M 11/0004 |
| | | | 277/591 |
| 6,036,541 A * | 3/2000 | Koumatsu | F16J 15/062 |
| | | | 215/355 |
| 6,178,282 B1 | 2/2001 | Moribe et al. | |
| 6,264,206 B1 * | 7/2001 | Hashizawa | F16J 15/061 |
| | | | 277/641 |
| 6,899,467 B2 | 5/2005 | McDonald et al. | |
| 7,013,074 B2 | 3/2006 | Battey et al. | |
| 7,239,789 B2 | 7/2007 | Grubish et al. | |
| 7,264,402 B2 | 9/2007 | Theuerkorn et al. | |
| 7,744,288 B2 | 6/2010 | Lu et al. | |
| 7,785,015 B2 | 8/2010 | Melton et al. | |
| 7,959,161 B2 * | 6/2011 | Seki | F16J 15/061 |
| | | | 277/630 |
| 8,213,760 B2 | 7/2012 | Rudenick et al. | |
| 8,556,520 B2 | 10/2013 | Elenbaas et al. | |
| 8,718,434 B2 | 5/2014 | Gronvall et al. | |
| 8,783,694 B2 * | 7/2014 | Matsuo | F16J 15/106 |
| | | | 277/637 |
| 8,820,798 B2 * | 9/2014 | Campfort | F16J 15/02 |
| | | | 277/609 |
| 9,229,186 B2 | 1/2016 | Allen | |
| 9,423,029 B2 * | 8/2016 | Coenegracht | H01R 13/508 |
| 9,502,878 B2 | 11/2016 | Coengracht et al. | |
| 9,575,279 B1 | 2/2017 | Yoshizawa | |
| 9,696,511 B2 | 7/2017 | Michiels et al. | |
| 2006/0220326 A1 * | 10/2006 | Leadley-Brown | F16J 15/025 |
| | | | 277/609 |
| 2007/0007038 A1 | 1/2007 | Cox et al. | |
| 2010/0147846 A1 * | 6/2010 | Soibel | B65D 43/0212 |
| | | | 220/202 |
| 2012/0230646 A1 | 9/2012 | Thompson et al. | |
| 2013/0294739 A1 | 11/2013 | Allen et al. | |
| 2015/0122699 A1 * | 5/2015 | Gregerson | H01L 21/67376 |
| | | | 206/711 |

FOREIGN PATENT DOCUMENTS

| | | |
|---|---|---|
| EP | 0 797 114 A2 | 9/1997 |
| ES | 1 134 583 U | 12/2014 |
| FR | 2 917 183 A1 | 12/2008 |
| WO | 2009/076536 A1 | 6/2009 |
| WO | 2009/089327 A2 | 7/2009 |
| WO | 2010/088202 A1 | 8/2010 |
| WO | 2012/074688 A2 | 6/2012 |
| WO | 2013166514 A1 | 11/2013 |
| WO | 2014/005916 A2 | 1/2014 |
| WO | 2014/128137 A2 | 8/2014 |
| WO | 2015/028428 A1 | 3/2015 |
| WO | 2015/158687 A1 | 10/2015 |

OTHER PUBLICATIONS

"Huawei Enterprise ICT Solutions a Better Way: ODN Solution Introduction", Huawei Technologies Co., Ltd., 2012, 28 pages.

Office Action, European Patent Application No. 15 788 438.8, 4 pages.

* cited by examiner

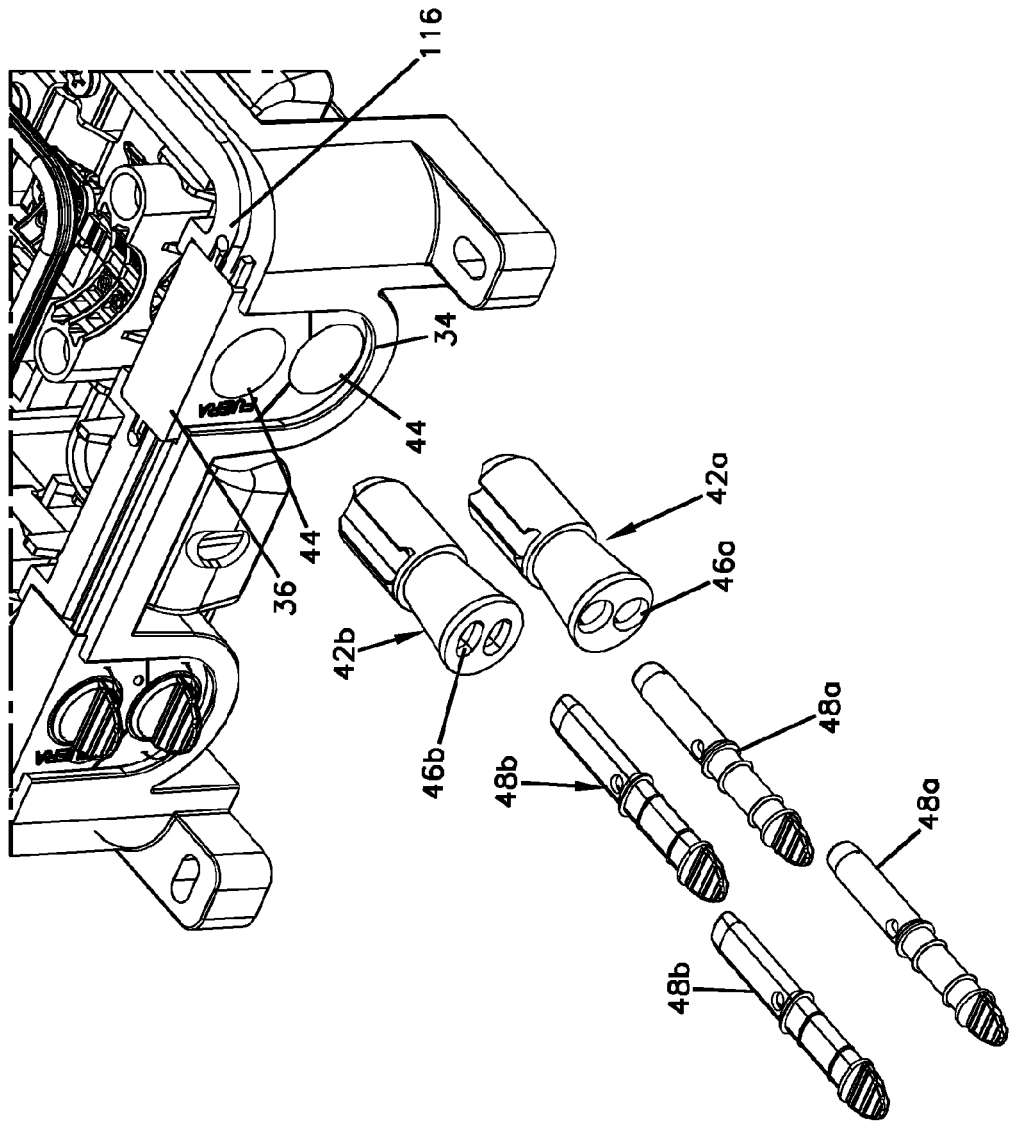

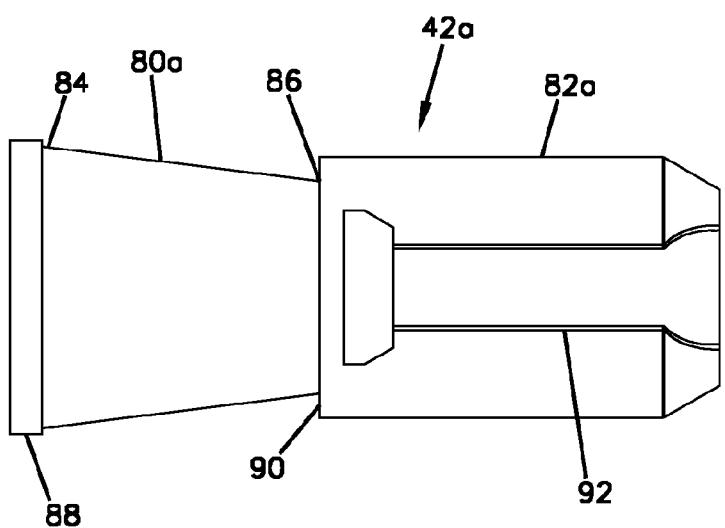
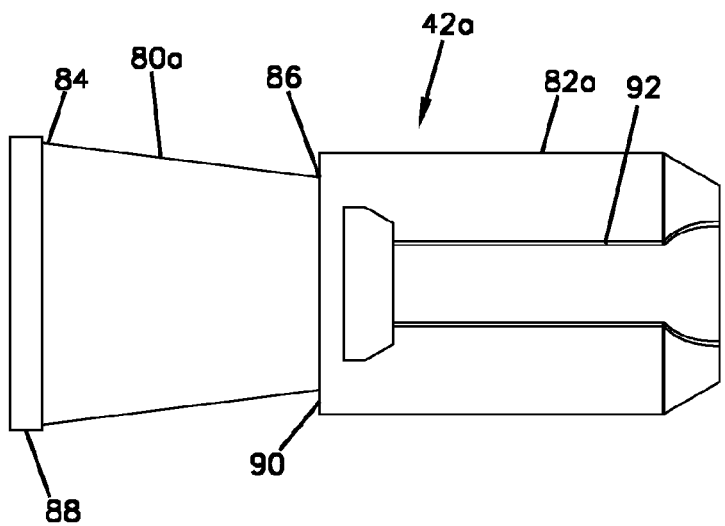
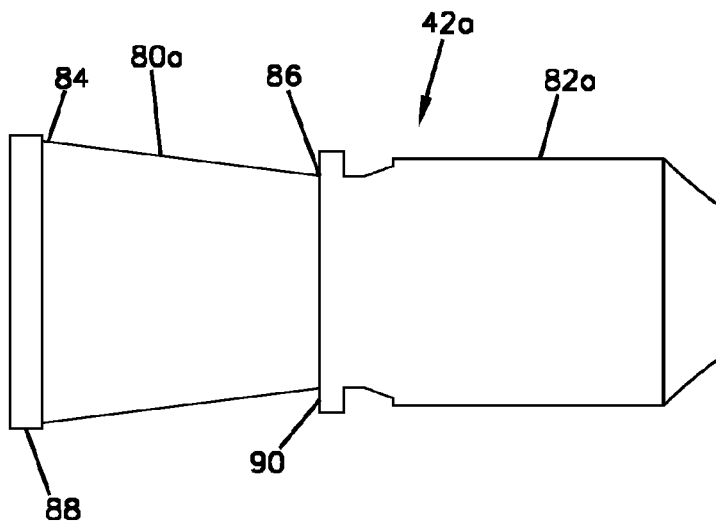

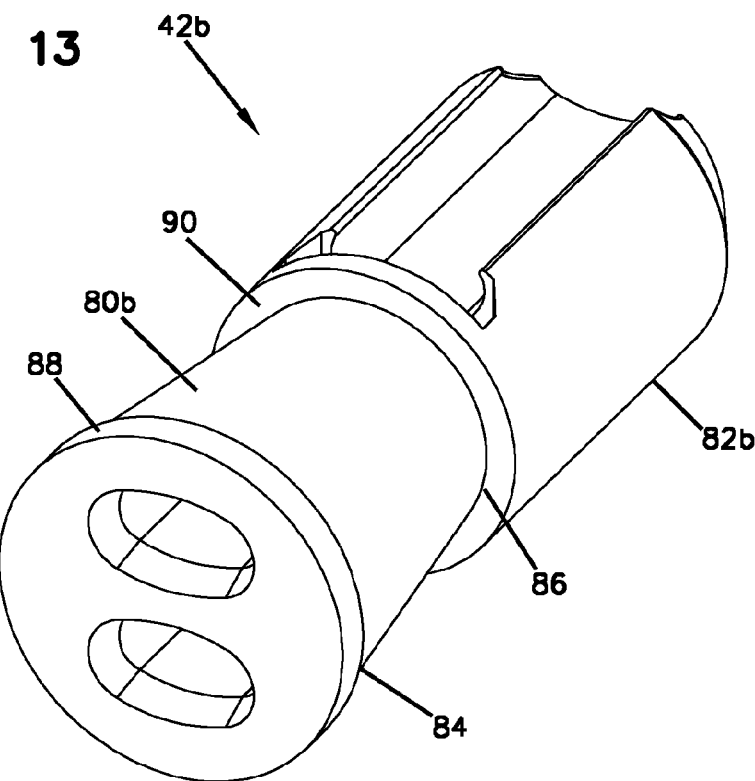
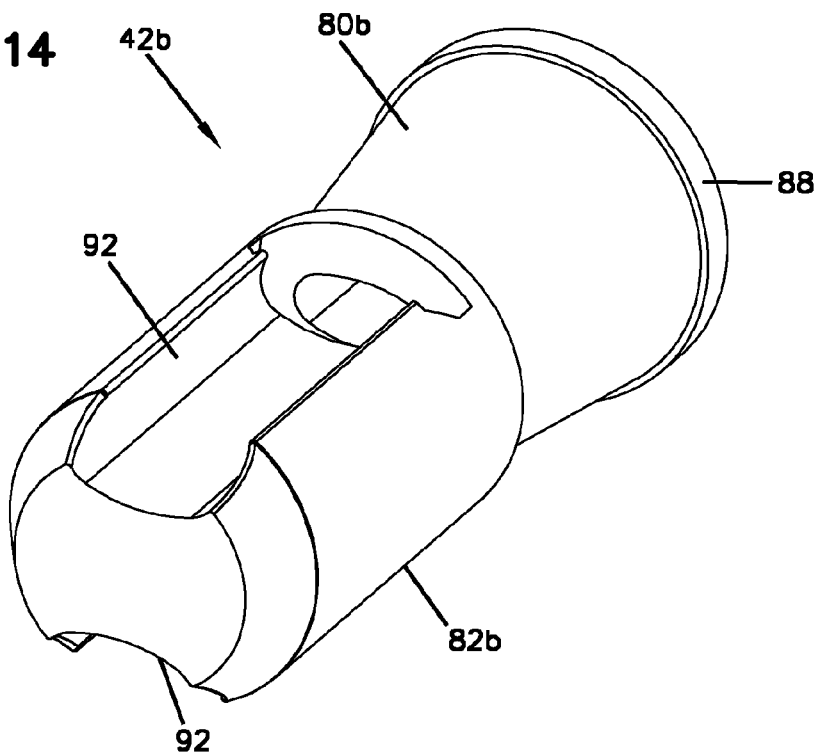

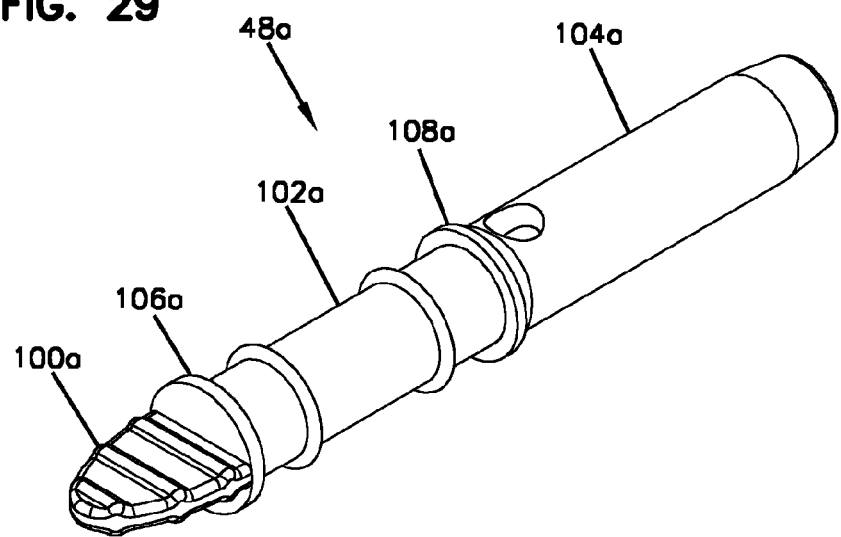
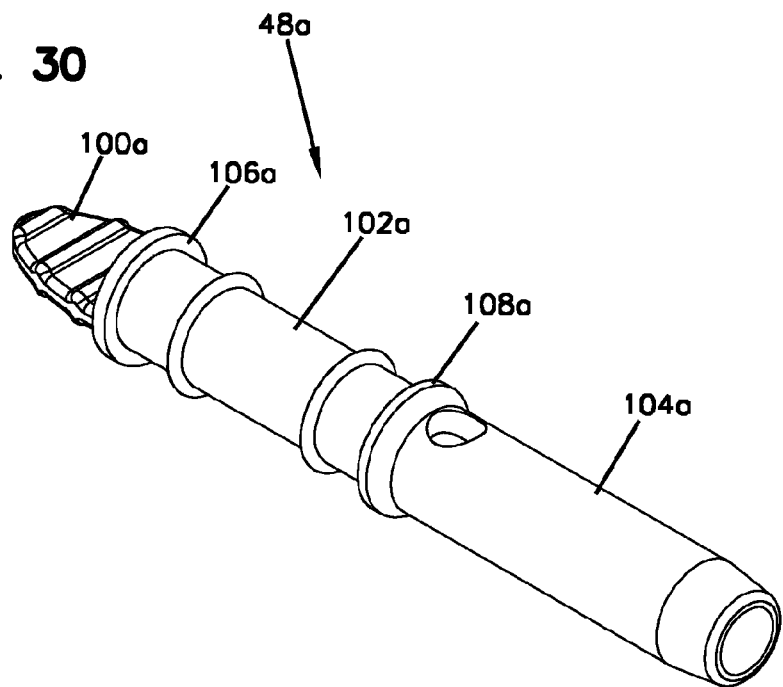

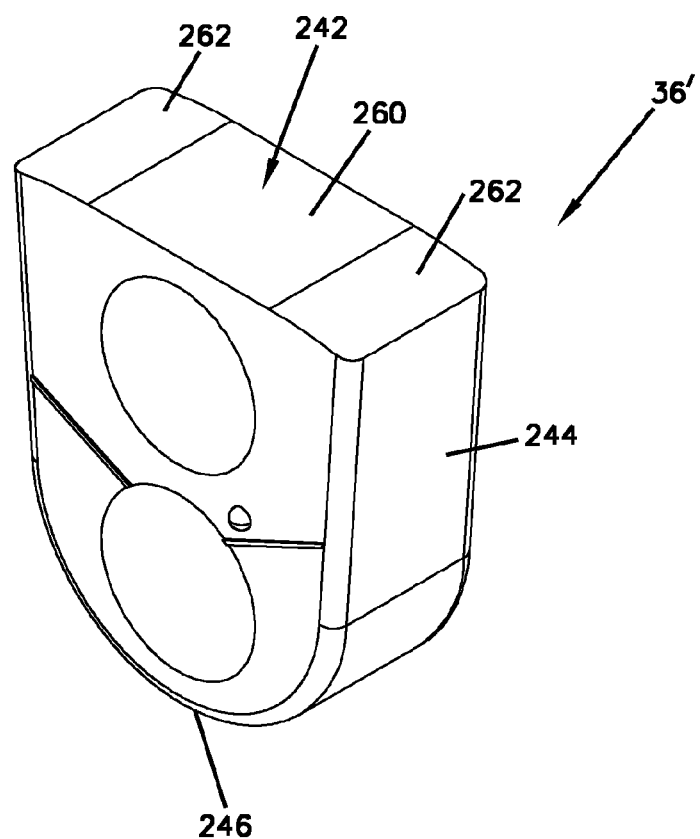
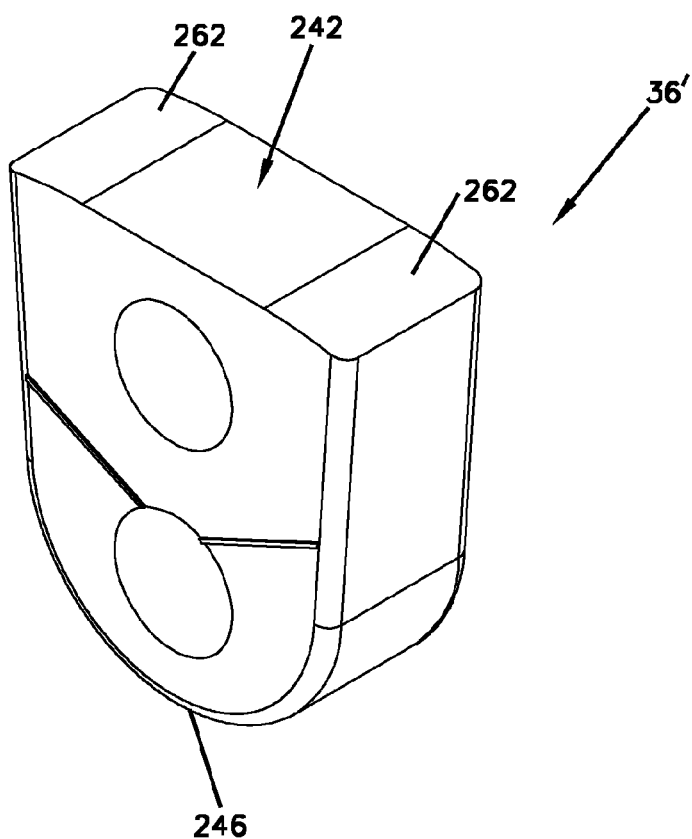

ENCLOSURE FOR USE IN A FIBER OPTIC DISTRIBUTION NETWORK

CROSS-REFERENCE TO RELATED APPLICATION

This application is a divisional of U.S. patent application Ser. No. 15/524,431, filed on May 4, 2017, which is a National Stage Application of PCT/EP2015/075694, filed on Nov. 4, 2015, which claims the benefit of U.S. Patent Application Ser. No. 62/074,967, filed on Nov. 4, 2014, the disclosures of which are incorporated herein by reference in their entireties. To the extent appropriate, a claim of priority is made to each of the above disclosed applications.

TECHNICAL FIELD

The present disclosure relates generally to enclosures. More particularly, the present disclosure relates to sealed, re-enterable enclosures used in fiber optic distribution networks.

BACKGROUND

Fiber optic distribution networks are becoming prevalent in part because service providers want to deliver high bandwidth communication capabilities to customers (i.e., subscribers). Fiber to the x (FTTX) refers to any broadband network architecture that uses optical fiber to provide all or part of the local loop used for last mile telecommunications. More specific broadband network architectures include fiber to the curb (FTTC), fiber to the distribution point (FTTdp), fiber to the premises (FTTP) and fiber to the desktop (FTTD). Typical fiber optic network architectures include a plurality of fiber optic cables distributed outwardly from a central location (e.g., a central office) toward subscriber locations.

In a typical fiber optic distribution network, sealed and re-enterable enclosures can be used to provide access to the optical fibers of the network distribution cables. Commonly, multi-fiber distribution cables are passed through the enclosures and optical fibers of the cables are accessed within the enclosures. Splice trays, passive optical splitters and wave length division multiplexers can be provided within the enclosures. In certain examples, optical fibers accessed from distribution cables can be coupled to optical components (e.g., a passive optical splitter or a wavelength division multiplexer) and outputs from the optical components can be coupled to drop cables routed from the enclosures. In certain examples, the enclosures can include ruggedized adapter ports for allowing pre-connectorized drop cables to be connected to the fibers accessed from the distribution cables. In other examples, fibers of the distribution cable can be spliced to optical fibers corresponding to drop cables routed out of the enclosure through sealed ports. Example enclosures of the type described above are disclosed at U.S. Pat. Nos. 8,213,760; 8,718,434; and 7,013,074.

SUMMARY

Effective sealing is an important consideration relating to sealed, re-enterable outdoor enclosures used in fiber optic distribution networks. Aspects of the present disclosure relate to enhanced sealing configurations for providing effective sealing of enclosures.

Certain aspects of the present disclosure relate to sealing configurations for effectively sealing triple points of an enclosure. One aspect of the present disclosure relates to an elastomeric cable seal having a main body and sealing tabs adapted for enhancing effective sealing at triple points formed at an interface between the main body and a housing of the enclosure. In certain examples, the tabs can be tapered along their lengths so as to narrow as the tabs extend away from the main body of the cable seal. In certain examples, the tabs are at a top end of the cable seal. Another aspect of the present disclosure relates to an elastomeric sealing member having a chamfered peripheral surface that provides an enhanced sealing at a triple point between the sealing member and a housing of the enclosure.

Further aspects of the present disclosure relate to sealing configurations for providing effective perimeter sealing between two housing pieces of an enclosure. In this regard, it is desirable to provide effective perimeter sealing without requiring excessive clamping pressures between the housing pieces and without requiring an excessive number of clamps or other fasteners provided about the perimeter of the enclosure. Certain aspects of the present disclosure relate to a perimeter sealing gasket having a transverse cross-sectional profile including an elongated web that is compressed along its length and that includes radial sealing ribs that project laterally outwardly from opposite sides of the web. In certain examples, ribs of the web can include enlarged, rounded heads. In certain examples, the transverse cross-sectional profile includes open space or voids on both sides of the web that assist in allowing the sealing gasket to be compressed at lower compression forces. In certain examples, the transverse cross-sectional profile is compressed at least 1 millimeter or at least 1.5 millimeters along the length of the web. In certain examples, the transverse cross-sectional profile is compressed at least 15, 20 or 25 percent along the length of the web from a non-compressed state to a compressed state when the housing pieces are latched together. In certain examples, the transverse cross-sectional profile is compressed at least 15-25 percent along the length of the web from a non-compressed state to a compressed state when the housing pieces are latched together. In certain examples, the gasket can have a Shore A hardness in the range of 20-60.

Other considerations that relate to the design of enclosures for fiber optic distribution networks include ease of use, reduction in cost, and a reduction in the total number of parts. In this regard, aspects of the present disclosure relate to port size reducers having an integrated configuration in which multiple functions can be provided by one port size reducer. For example, port size reducers in accordance with the principles of the present disclosure can provide port size reducing functions, cable sealing functions and cable clamping functions. Other aspects of the present disclosure relate to blind plugs that are multi-functional. For example, certain blind plugs in accordance with the principles of the present disclosure can provide port closing functionality and can also interface with a cable anchoring station for assisting in anchoring fiber optic cables to an enclosure.

A variety of additional inventive aspects will be set forth in the description that follows. Inventive aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

FIG. 4A is an enlarged, detailed view of a portion of FIG. 4;

FIG. 7 is a top view of the port size reducer of FIG. 5;

FIG. 8 is a bottom view of the port size reducer of FIG. 5;

FIG. 9 is a first side view of the port size reducer of FIG. 5;

FIG. 13 is a perspective view of another port size reducer in accordance with the principles of the present disclosure;

FIG. 14 is another perspective view of the port size reducer of FIG. 13;

FIG. 29 is a perspective view of another blind plug in accordance with the principles of the present disclosure;

FIG. 30 is another perspective view of the blind plug of FIG. 29;

FIG. 47 is a perspective view of another cable seal in accordance with the principles of the present disclosure;

FIG. 48 is another perspective view of the cable seal of FIG. 47;

DETAILED DESCRIPTION

Aspects of the present disclosure relate to enclosures having perimeter sealing that provides effective sealing at relatively low compression levels. Another aspect of the present disclosure relates to cable seal configurations that provide enhanced sealing at triple point locations defined between housing pieces of the enclosure. Still another aspect of the present disclosure relates to elongated, multi-function port size reducers and blind plugs adapted to reduce the part count and complexity of the enclosure.

Figure 1:
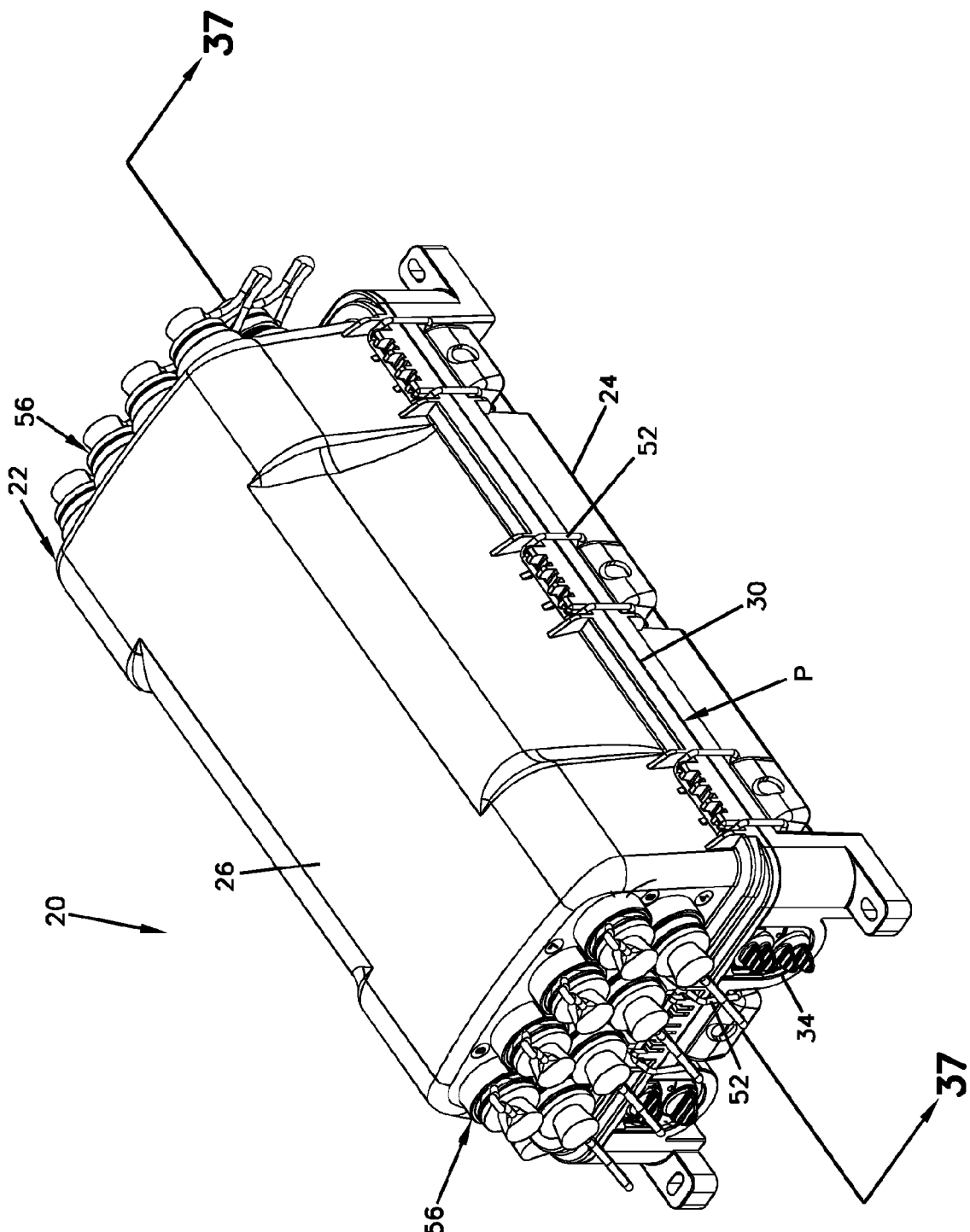
FIG. 1 is a perspective view illustrating an enclosure in accordance with the principles of the present disclosure adapted for use in a fiber optic distribution network.

FIG. 1 illustrates an enclosure 20 in accordance with the principles of the present disclosure suitable for use in a fiber optic distribution network. The enclosure 20 includes a housing 22 having a first housing piece 24 (e.g., a base) and a second housing piece 26 (e.g., a cover). The first and second housing pieces 24, 26 are configured to be coupled together to define a housing interior 28 (see FIG. 2). The first and second housing pieces 24, 26 interface with one another (e.g., mate together, engage one another, etc.) at an interface location 30 that extends about a perimeter P of the housing 22. A gasket 32 provides a perimeter seal between the first housing piece 24 and the second housing piece 26. The gasket 32 is positioned between the first and second housing pieces 24, 26 at the interface location 30. The first housing piece 24 defines a plurality of cable seal openings 34 in which cable seals 36 are mounted. Cable anchoring stations 38 (i.e., locations) are positioned within the housing interior 28 for anchoring cables routed through the cable seals 36 relative to the housing 22. The cable anchoring stations 38 include cable clamping locations 40 positioned in alignment with the cable seal openings 34. Port size reducer plugs 42a, 42b are shown mounted within major cable ports 44 defined by the cable seals 36. The port size reducer plugs 42a, 42b respectively define minor cable ports 46a, 46b. Blind plugs 48a, 48b are respectively mounted within the minor cable ports 46a, 46b. The port size reducer plugs 42a, 42b and the blind plugs 48a, 48b are constructed to perform multiple functions and include portions that interact with the cable seals 36 and portions that interact with the cable anchoring stations 38. In certain examples, the port size reducer plugs 42a, 42b are elongated and each has a molded, monolithic, one-piece construction. Similarly, the blind plugs 48a, 48b are also elongated and can each have a molded, monolithic, one-piece construction.

Figure 2:
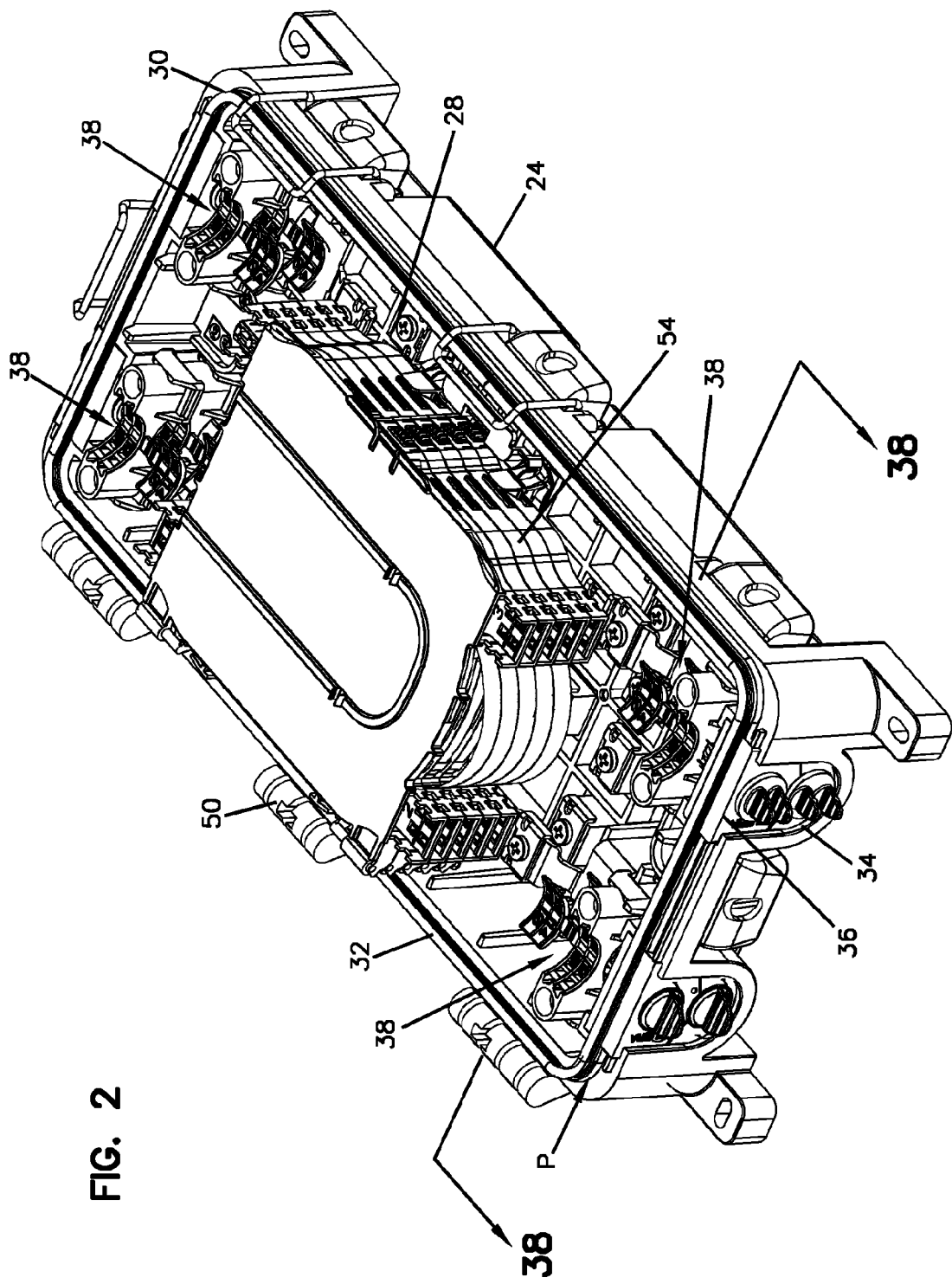
FIG. 2 illustrates a base of the enclosure of FIG. 1 with a cover of the enclosure removed.
Figure 3:
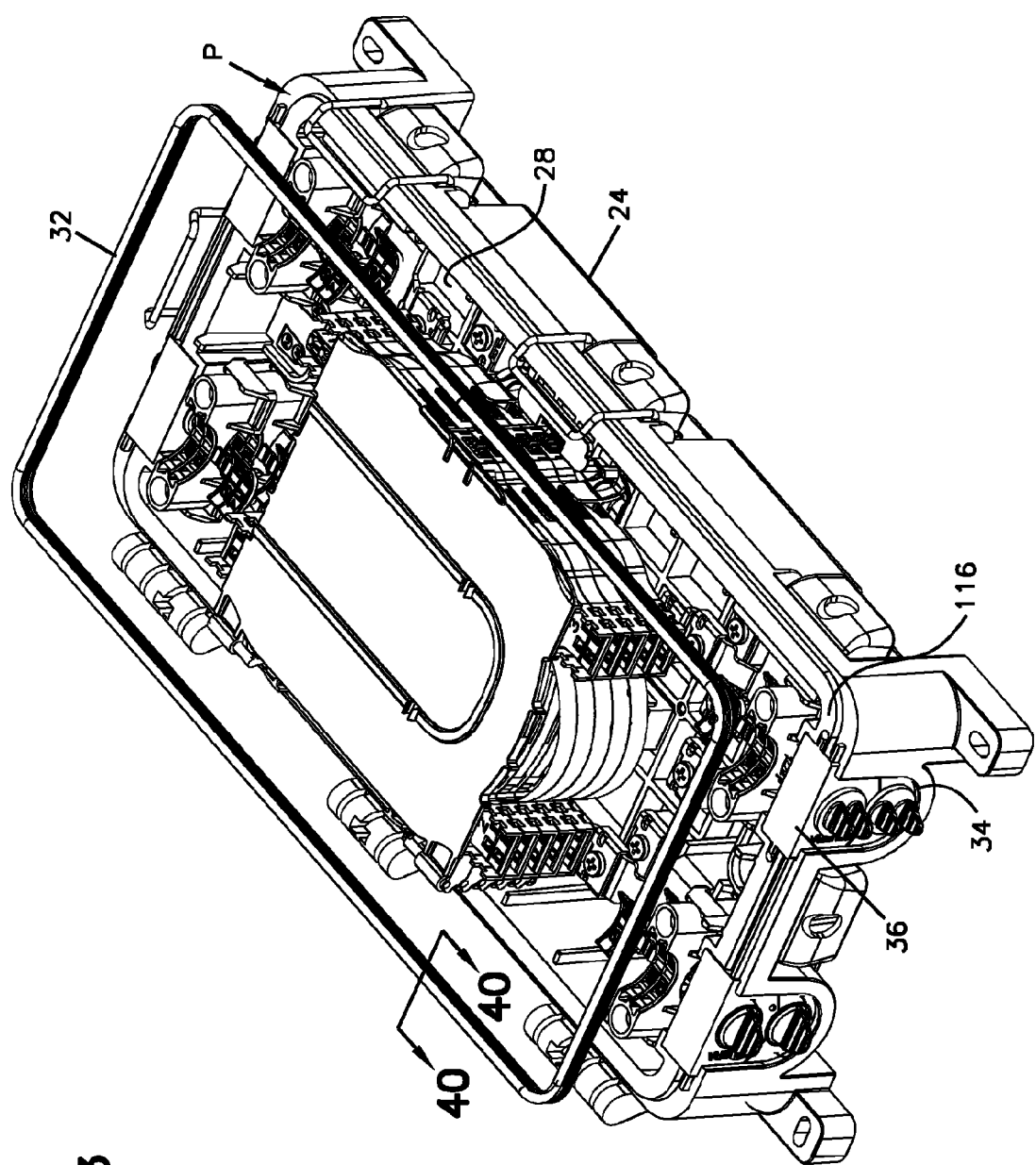
FIG. 3 illustrates the base of FIG. 2 with a perimeter gasket of the enclosure exploded from the base.
Figure 3A:
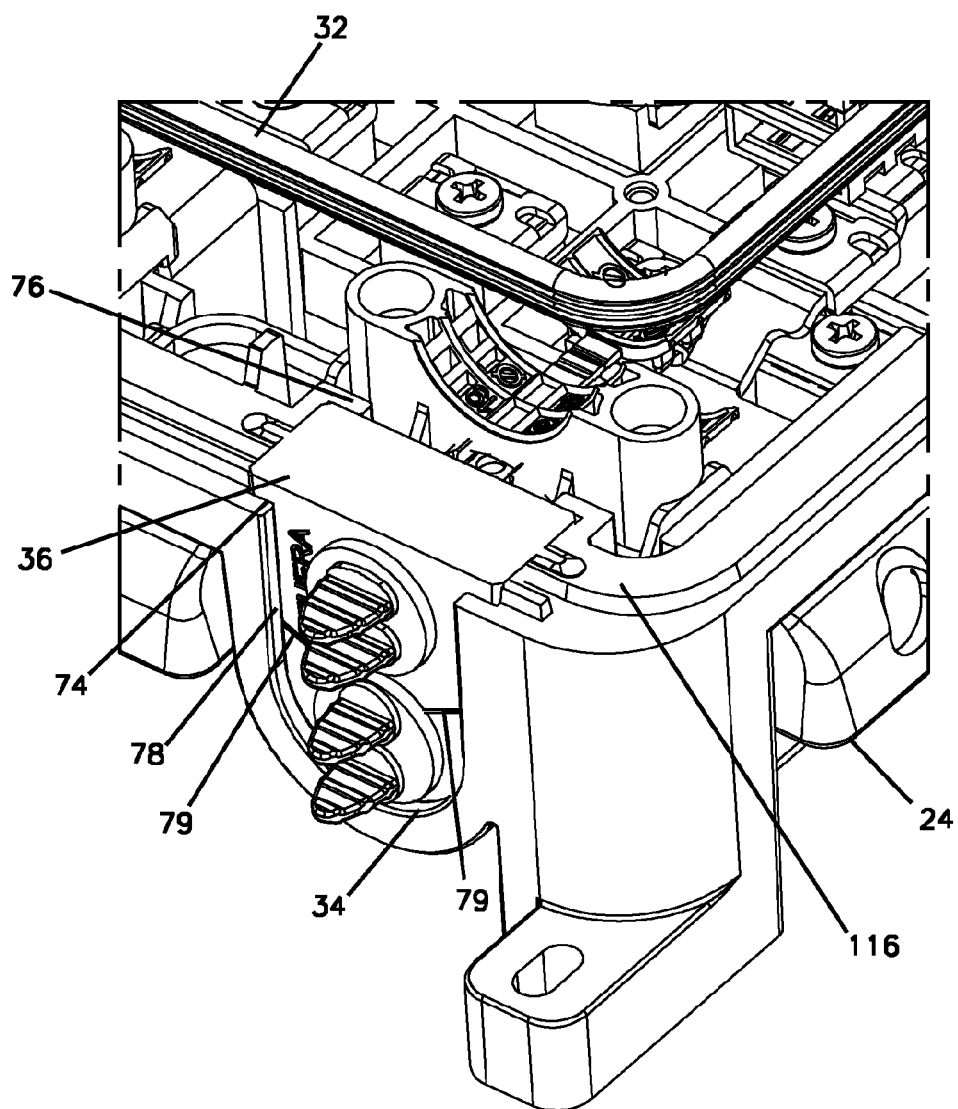
FIG. 3A is an enlarged, detailed view of a portion of FIG. 3.

Referring to FIGS. 1 and 2, the first and second housing pieces 24, 26 can be pivotally connected at a hinge 50 that extends along a major side of the housing 22. Clamping latches 52 can be used to secure (e.g., clamp, fix or otherwise retain) the first and second housing pieces 24, 26 together. In certain examples, single clamping latches 52 are provided at minor sides of the housing 22 and a plurality of clamping latches 52 are provided at a major side of the housing 22 that is opposite from the hinge 50.

As shown at FIG. 2, a stack of pivotal fiber management trays 54 is shown mounted within the first housing piece 24. The fiber management trays 54 can include fiber routing paths for routing excess optical fiber in looped configurations that prevent the optical fiber from being bent beyond minimum bend radius requirements. The fiber management trays 54 can also function as splice holders for holding a plurality of splices. Additionally, the fiber management trays 54 can retain and protect fiber optic components such as passive optical splitters and/or wavelength division multiplexers.

Figure 37:
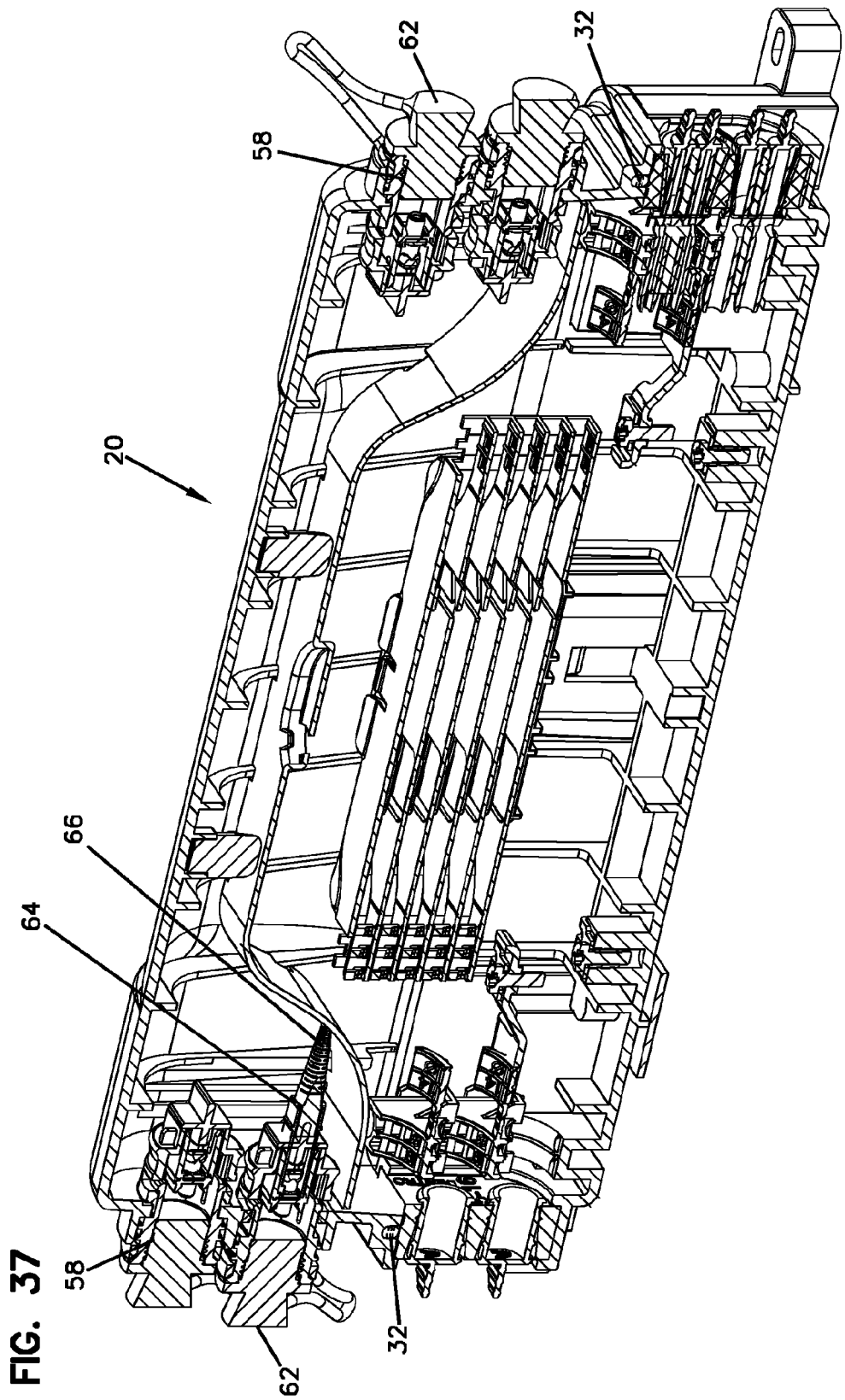
FIG. 37 is a cross-sectional view of the enclosure of FIG. 1 taken along section line 37-37 of FIG. 1.

As shown at FIGS. 1 and 37, a plurality of ruggedized fiber optic adapters 56 are shown mounted to the second housing piece 26. The ruggedized fiber optic adapters 56 include exterior ports 58 and interior ports 60. The exterior ports 58 are adapted to receive ruggedized fiber optic connectors corresponding to pre-connectorized drop cables. As depicted, the exterior ports 58 are enclosed by dust plugs 62 and are environmentally sealed. By removing the dust plugs 62, the ruggedized fiber optic connectors corresponding to the pre-connectorized drop cables can be inserted into the exterior ports 58. Preferably, a sealed relationship exists between the ruggedized fiber optic connectors and the exterior ports 58 of their corresponding ruggedized fiber optic adapters 56. Additionally, a robust coupling technique (e.g., a threaded coupling, a bayonet style coupling or other like type of coupling) can be used to secure the ruggedized fiber optic connectors to the ruggedized fiber optic adapters 56. The interior ports 60 of the ruggedized fiber optic adapters 56 receive connectorized ends 64 of connectorized pigtails 66. When the ruggedized fiber optic connectors are inserted within the exterior ports 58 of the ruggedized fiber optic adapters 56, the ruggedized fiber optic connectors are optically coupled to the connectorized ends 64 of the corresponding connectorized pigtails 66. It will be appreciated that a sealed relationship exists between the ruggedized fiber optic adapters 56 and the housing 22. Similarly, a sealed interface exists between the ruggedized fiber optic connectors and the ruggedized fiber optic adapters 56.

In use of the enclosure 20, a multi-fiber distribution cable such as a trunk cable can be passed through the interior of the enclosure by routing the trunk cable through the major cable ports 44 defined by the cable seals 36. The portion of the distribution cable within the housing interior 28 can be subjected to a window-cutting operation in which the outer jacket is removed to provide access to the optical fibers of the distribution cable. Selected ones of the optical fibers can be accessed, cut and optically coupled to smaller cables (e.g., drop cables) routed from the enclosure 20 through the port size reducers. For example, the accessed fibers can be routed to the fiber management trays 54 and spliced to optical fibers corresponding to drop cables routed out of the enclosure 20 through the minor cable ports 46a, 46b defined by the port size reducer plugs 42a, 42b. Alternatively, the accessed optical fibers can be routed to the fiber management trays 54 and spliced to the connectorized pigtails 66 having the connectorized ends 64 inserted within the interior ports 60 of the ruggedized fiber optic adapters 56. In still other examples, the optical fibers accessed from the pass-through cable can be routed to the fiber management trays 54 and optically coupled to fiber optic components supported on the fiber management trays 54 such as passive optical splitters or wavelength division multiplexers. The optical outputs of such fiber optic components can be optically coupled to the connectorized pigtails 66 having connectorized ends 64 inserted within the interior ports 60 of the ruggedized fiber optic adapters 56 or can be optically coupled to optical fibers corresponding to cables routed out of the enclosure 20 through the minor cable ports 46a, 46b.

Figure 38:
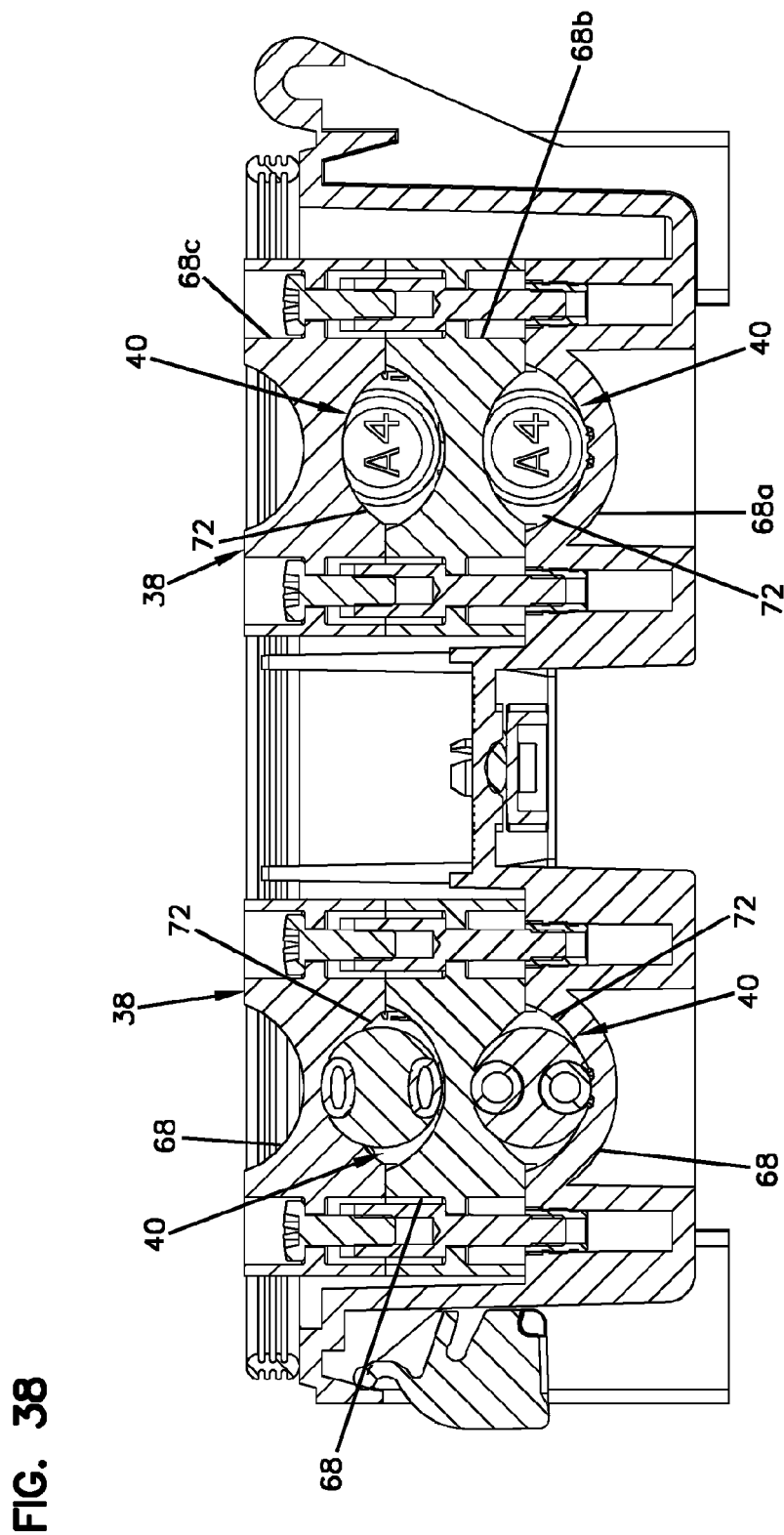
FIG. 38 is a cross-sectional view through the base of FIG. 2 taken along section line 38-38 of FIG. 2.

Referring to FIGS. 2 and 37-39, the cable anchoring stations 38 can include a plurality of clamping elements 68 that can cooperate to define the cable clamping locations 40. In certain examples, the clamping elements 68 can be stacked on top of one another and fastened together using fastening elements. In certain examples, the fastening elements can include fasteners such as bolts 70. As shown at FIG. 38, the clamping elements 68 can include lower clamping elements 68a that are integrated with the first housing piece 24. The clamping elements 68 can also include intermediate clamping elements 68b fastened to the lower clamping elements 68a, and upper clamping elements 68c fastened to the intermediate clamping elements 68b. The cable clamping locations 40 can be provided at clamping pockets or receptacles 72 defined between the clamping elements 68. In certain examples, the clamping pockets 72 can be relatively large in size and can be configured for receiving relatively large cables such as the trunk cables that are passed through the enclosure 20. It will be appreciated that the clamping pockets 72 are generally co-axially aligned with the major cable ports 44 defined by the cable seals 36.

It will be appreciated that the cable seals 36, the gasket 32 and the port reducing plugs 42a, 42b can all have resilient, elastomeric constructions. In certain examples, the various sealing components can have a polymeric construction, a rubber construction or a rubber-like construction. In certain examples, the sealing elements can be compressible and can be configured to elastically deform to fill voids for sealing purposes.

As previously indicated, the cable seals 36 mount at the cable seal openings 34 of the first housing piece 24. It will be appreciated that the cable seal openings 34 can be configured to effectively retain the cable seals 36. For example, the cable seal openings 34 can define seal retention pockets 74 defined by inner and outer flanges 76, 78. The inner and outer flanges 76, 78 overlap the cable seals 36 such that the cable seals 36 are effectively retained within the cable seal openings 34. The cable seals 36 can include slit or tear locations 79 so as to function as wrap-around seals for allowing cables to be laterally inserted into the major cable ports 44.

It will be appreciated that the major cable ports 44 defined by the cable seals 36 are configured to receive round, relatively large fiber optic cables. Examples of this type of cable include multi-fiber distribution cables of the type typically passed through the enclosure 20. The port size reducer plugs 42a, 42b can function as port size converters for allowing the cable seals 36 to accommodate smaller cables. For example, when the port size reducer plugs 42a, 42b are inserted within the major cable ports 44 of the cable seals 36, a sealed relationship exists between the exterior of the port size reducer plugs 42a, 42b and the cable seals 36. The minor cable ports 46a, 46b are configured for receiving and sealing smaller cables such as drop cables. The minor cable ports 46a are adapted for receiving round cables while the minor cable ports 46b are adapted for receiving flat cables. The blind plugs 48a, 48b are configured to plug and seal the minor cable ports 46a, 46b when the minor cable ports 46a, 46b are not occupied by cables. When it is desired to route a cable through one of the minor cable ports 46a, 46b, the corresponding blind plug 48a, 48b is removed thereby allowing for the insertion of the corresponding cable through the corresponding minor cable port 46a, 46b.

Figure 4:
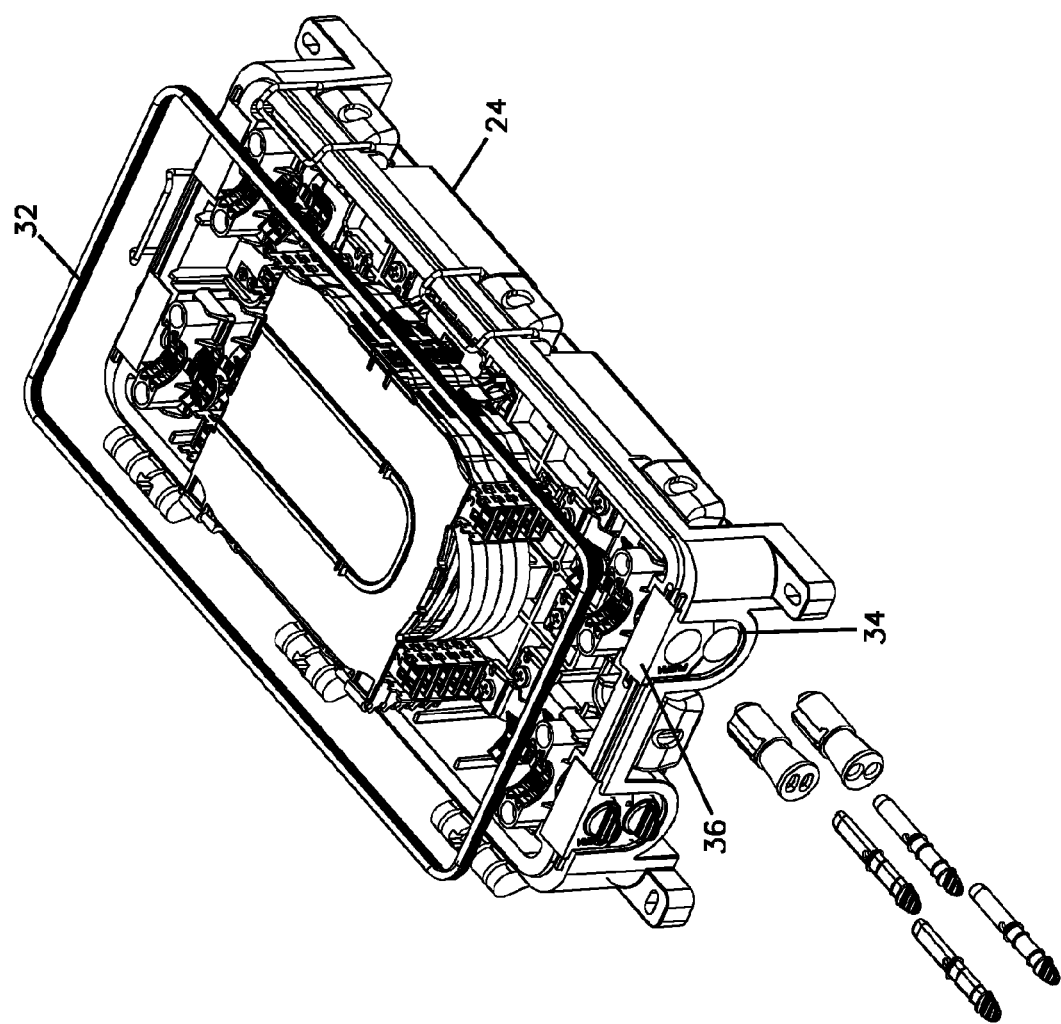
FIG. 4 shows the base of FIG. 2 with port size reducers and blind plugs exploded outwardly from a cable seal mounted within a cable seal opening of the base.
Figure 5:
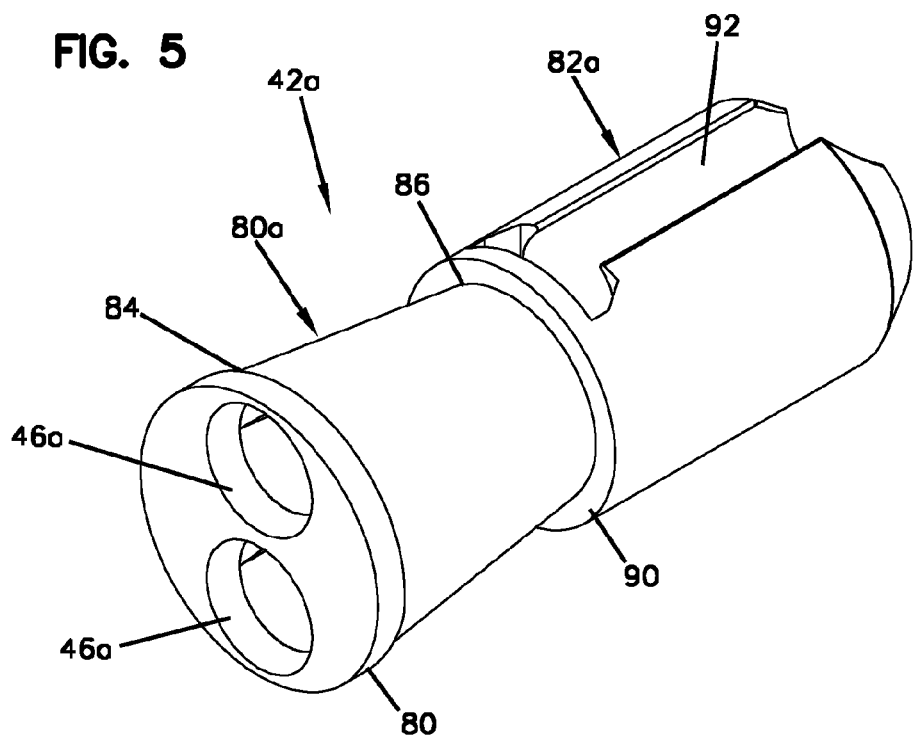
FIG. 5 is a perspective view of a port size reducer in accordance with the principles of the present disclosure.
Figure 6:
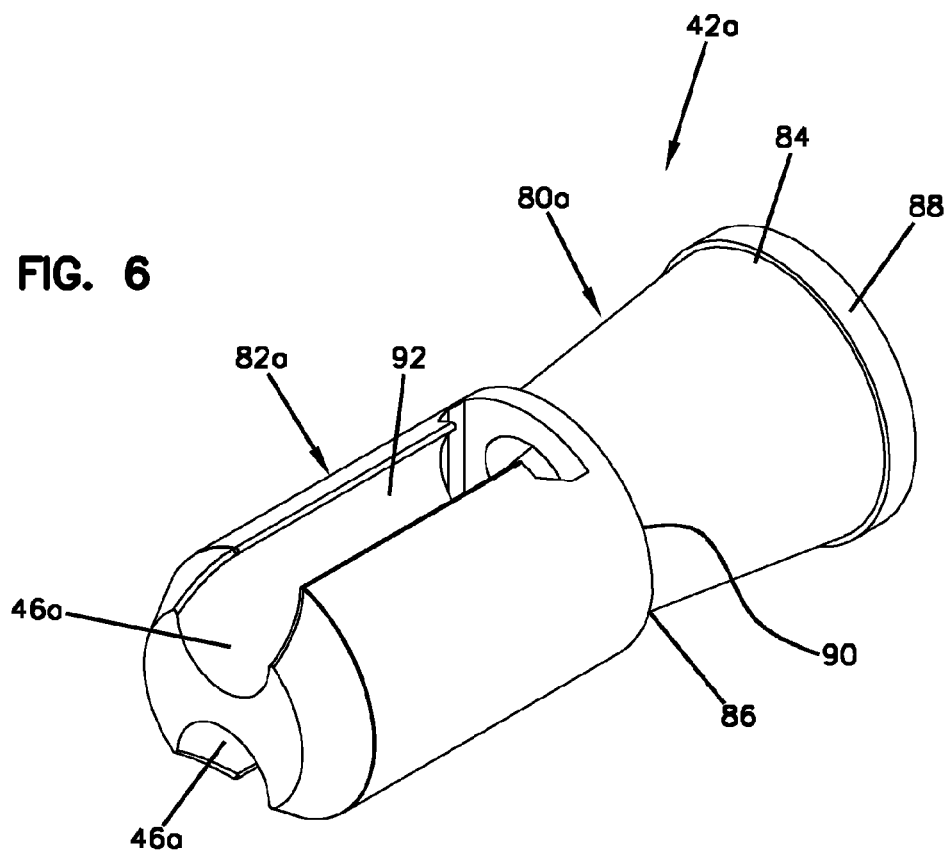
FIG. 6 is another perspective view of the port size reducer of FIG. 5.
Figure 10:
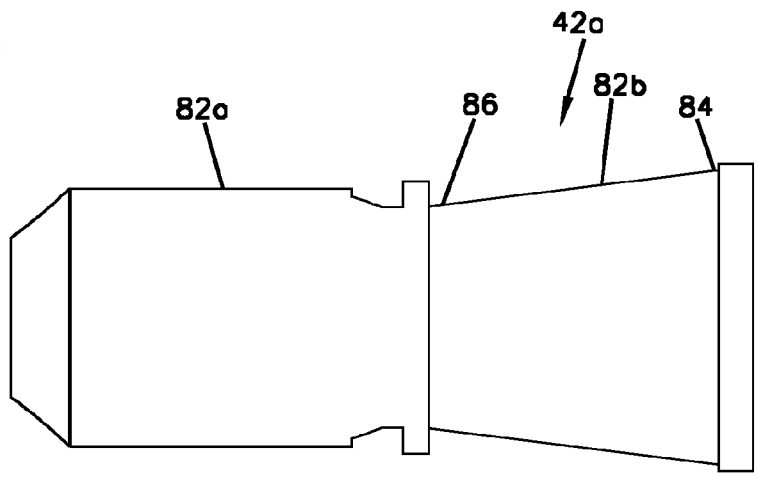
FIG. 10 is a second, opposite side view of the port size reducer of FIG. 5.
Figure 11:
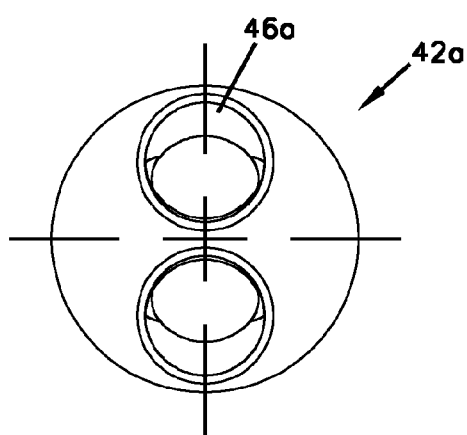
FIG. 11 is an outer end view of the port size reducer of FIG. 5.
Figure 12:
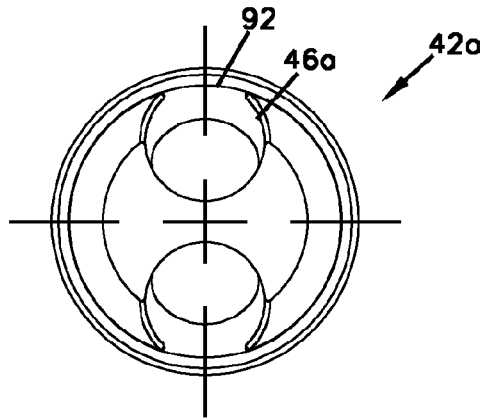
FIG. 12 is an inner end view of the port size reducer of FIG. 5.
Figure 15:
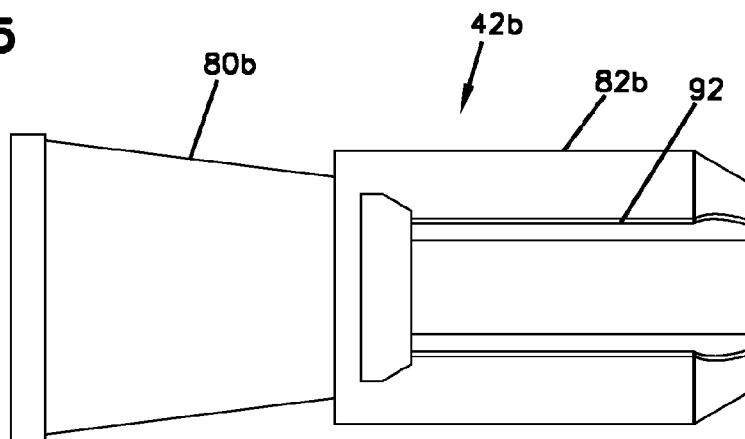
FIG. 15 is a top view of the port size reducer of FIG. 13.
Figure 16:
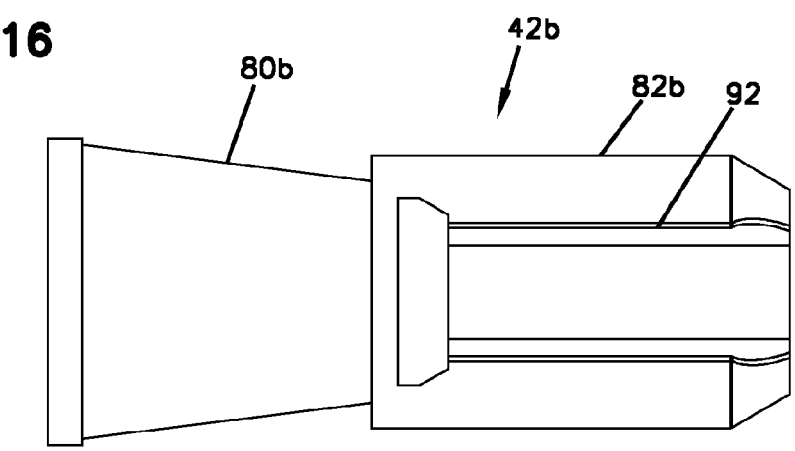
FIG. 16 is a bottom view of the port size reducer of FIG. 13.
Figure 17:
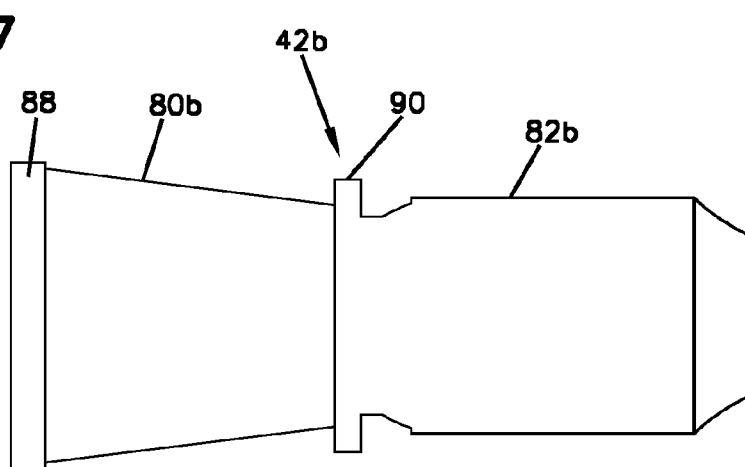
FIG. 17 is a first side view of the port size reducer of FIG. 13.
Figure 18:
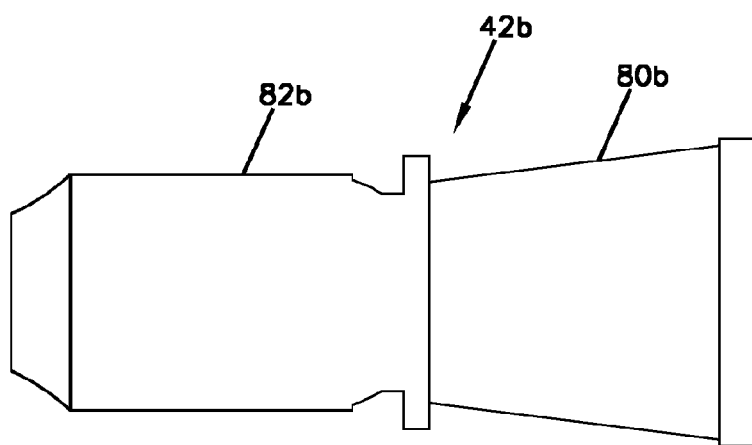
FIG. 18 is a second, opposite side view of the port size reducer of FIG. 13.
Figure 19:
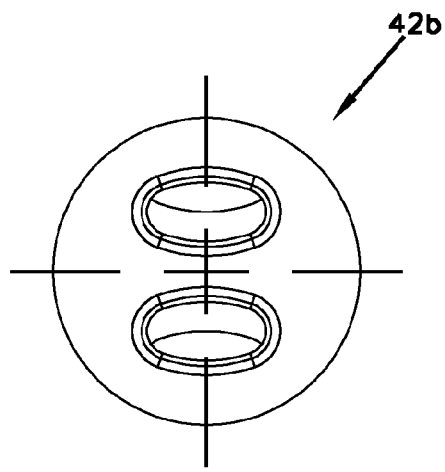
FIG. 19 is an outer, end view of the port size reducer of FIG. 13.
Figure 20:
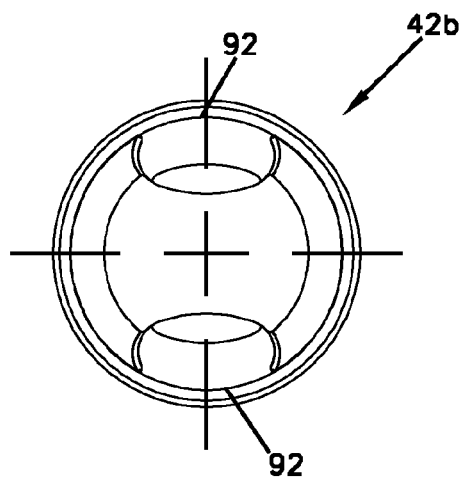
FIG. 20 is an inner end view of the port size reducer of FIG. 13.
Figure 21:
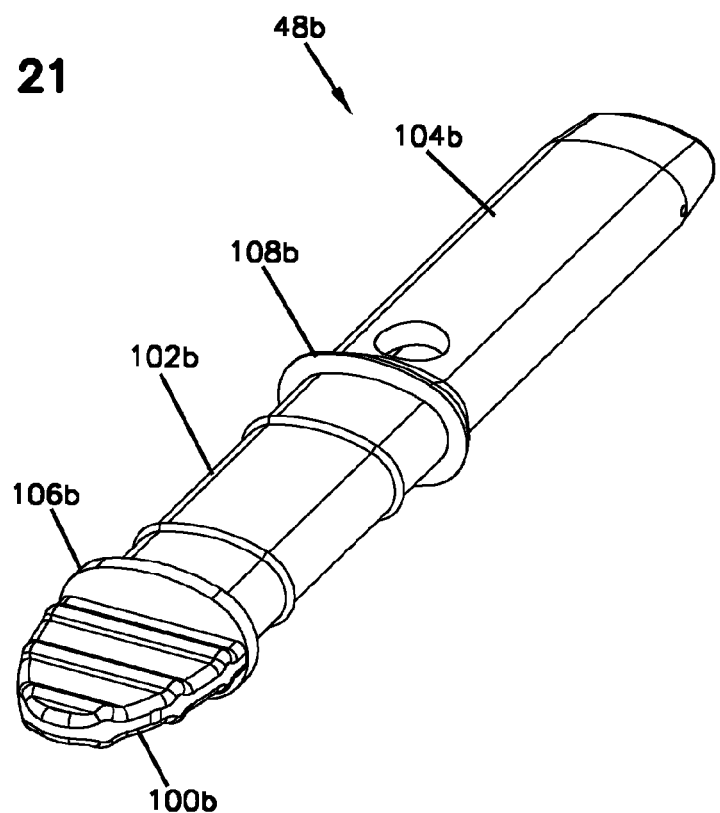
FIG. 21 is a perspective view of a blind plug in accordance with the principles of the present disclosure.
Figure 22:
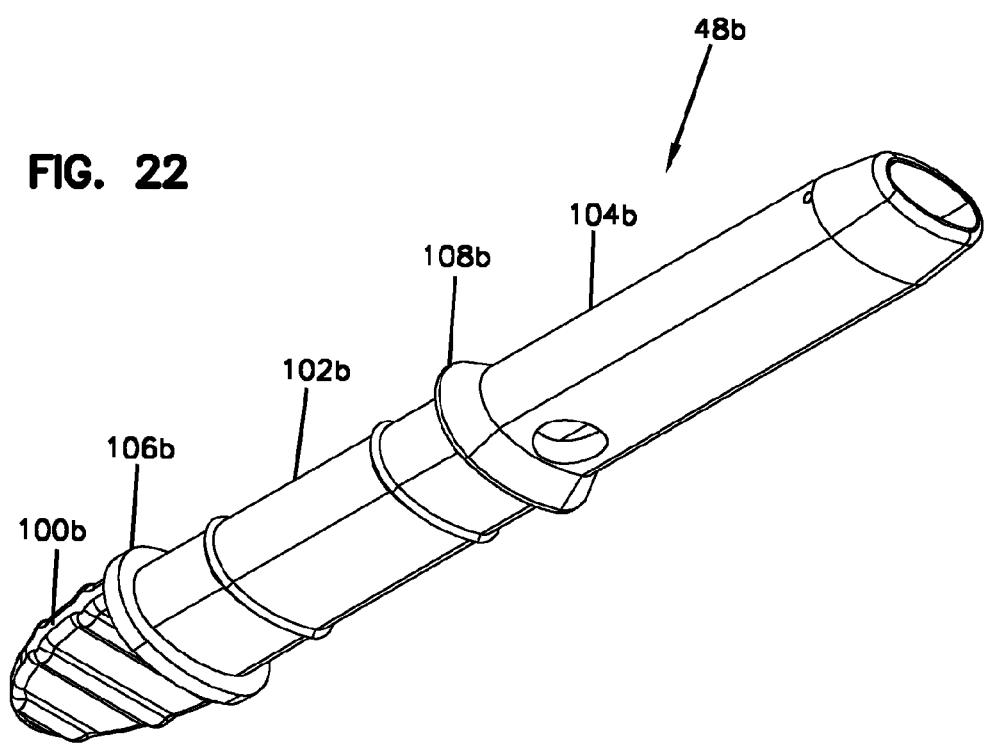
FIG. 22 is another perspective view of the blind plug of FIG. 21.
Figure 23:
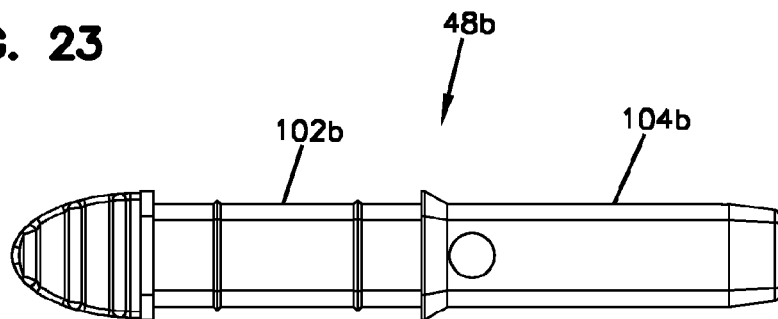
FIG. 23 is a top view of the blind plug of FIG. 21.
Figure 24:
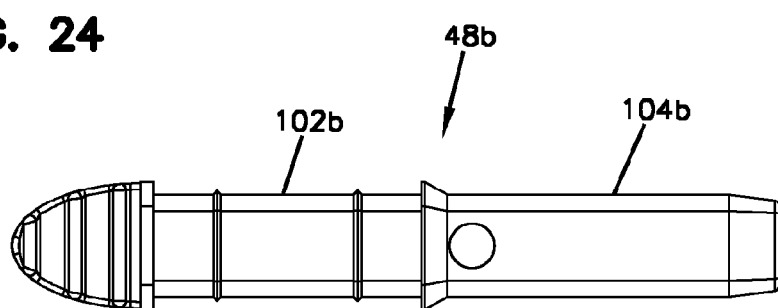
FIG. 24 is a bottom view of the blind plug of FIG. 21.
Figure 25:
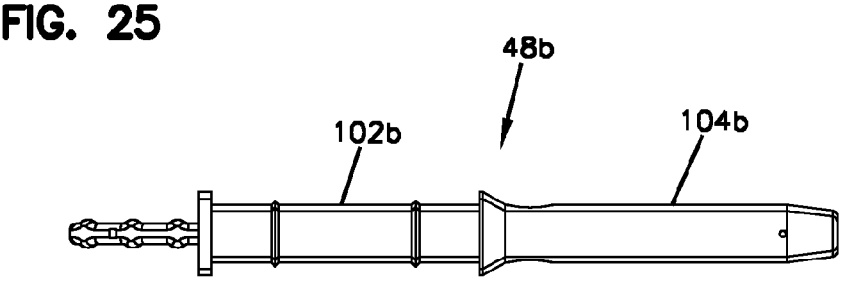
FIG. 25 is a first side view of the blind plug of FIG. 21.
Figure 26:
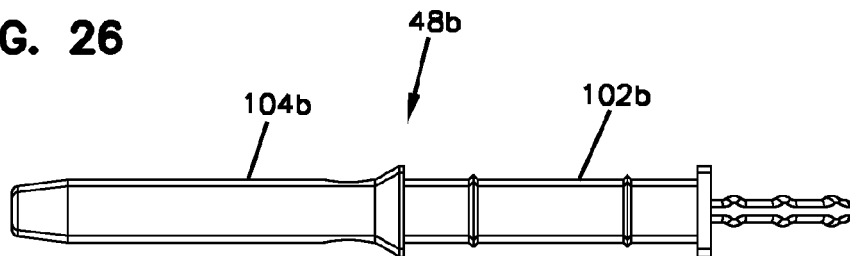
FIG. 26 is a second, opposite side view of the blind plug of FIG. 21.
Figure 27:
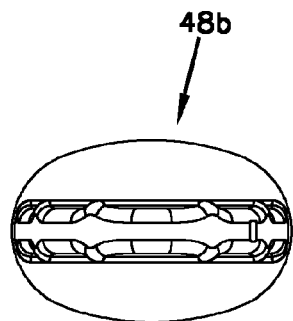
FIG. 27 is an outer end view of the blind plug of FIG. 21.
Figure 28:
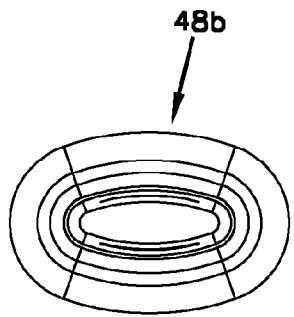
FIG. 28 is an inner end view of the blind plug of FIG. 21.
Figure 31:
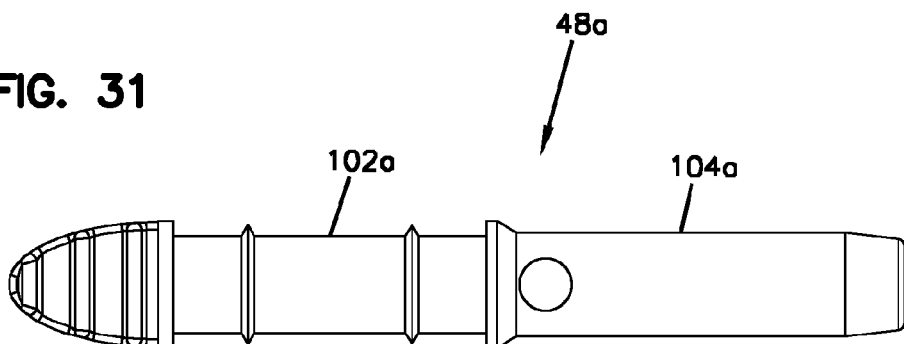
FIG. 31 is a top view of the blind plug of FIG. 29.
Figure 32:
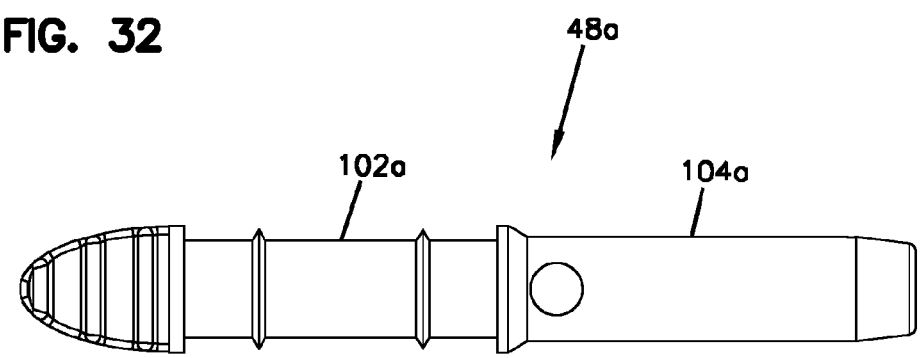
FIG. 32 is a bottom view of the blind plug of FIG. 29.
Figure 33:
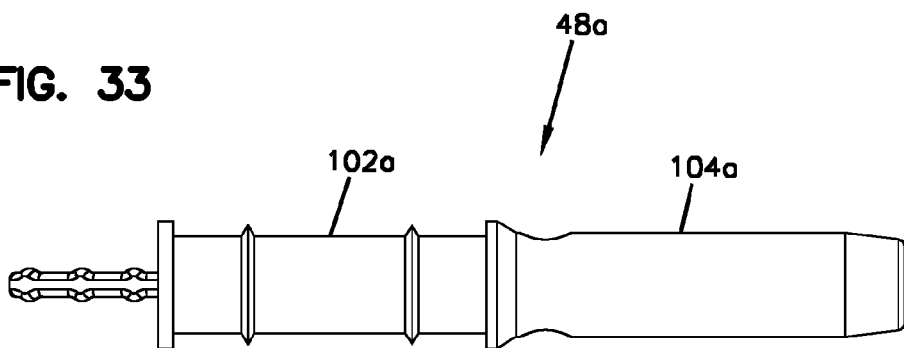
FIG. 33 is a first, side view of the blind plug of FIG. 29.
Figure 34:
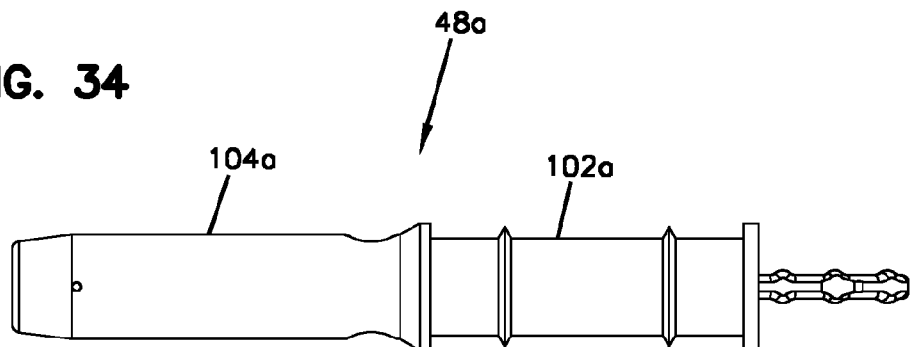
FIG. 34 is a second, opposite side view of the blind plug of FIG. 29.
Figure 35:
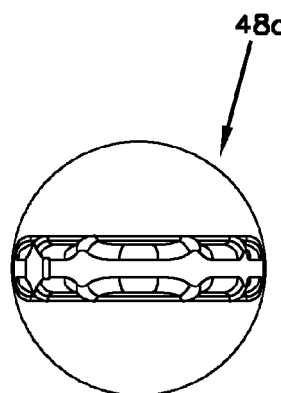
FIG. 35 is an outer, end view of the blind plug of FIG. 29.
Figure 36:
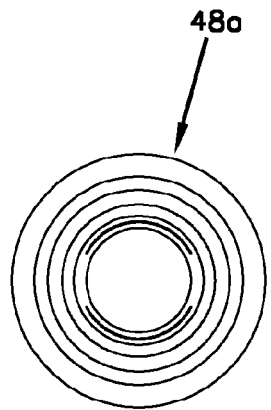
FIG. 36 is an inner, end view of the blind plug of FIG. 29.

Referring to FIG. 4A, each of the port size reducer plugs 42a, 42b has a one-piece construction with different sections (e.g., portions, regions, extents) configured to perform different functions with respect to the enclosure 20. The different functions can include port size reducing functions, cable sealing functions and cable anchoring functions. In certain examples, the minor cable ports 46a, 46b can extend through lengths of the port size reducer plugs 42a, 42b. The port size reducer plugs 42a, 42b can include first portions 80a, 80b and second portions 82a, 82b positioned along the lengths of the port size reducer plugs 42a, 42b. The port size reducer plugs 42a, 42b are sized in shape such that the first portions 80a, 80b are configured to fit in a sealed relationship within the major cable ports 44. The second portions 82a, 82b of the port size reducer plugs 42a, 42b are configured to fit within the clamping pockets 72 defined at the clamping locations 40 of the cable anchoring stations 38.

The first portions 80a, 80b of the port size reducer plugs 42a, 42b function as port size converters for converting the cable seals 36 to accommodate smaller cables. The first portions 80a, 80b can fill the major cable ports 44 of the cable seals 36 and can include exterior surfaces that make sealed contact with the interior of the cable seals 36. The minor cable ports 46a, 46b can have transverse cross-sectional shapes that are fully enclosed at the first portions 80a, 80b so as to provide uninterrupted sealing about the exterior surface of a cable (e.g., a drop cable) routed therethrough. In certain examples, the first portions 80a, 80b of the port size reducer plugs 42a, 42b can have truncated conical shapes having major ends 84 and minor ends 86. The truncated conical shapes of the first portions 80a, 80b can match corresponding truncated conical shapes of the major cable ports 44. The port size reducer plugs 42a, 42b can include first and second retention shoulders 88, 90 positioned adjacent to the major and minor ends 84, 86 of the truncated conical shapes of the first portions 80a, 80b. The first and second retention shoulders 88, 90 can engage inner and outer faces of the cable seals 36 to provide for axial retention of the port size reducer plugs 42a, 42b within the cable seals 36.

The second portions 82a, 82b of the port size reducer plugs 42a, 42b are adapted to assist in providing an effective clamping function at the cable anchoring stations 38 for smaller cables. For example, the second portions 82a, 82b are configured to fit within the clamping pockets 72 and to assist in clamping drop cables routed through the minor cable ports 46a, 46b within the clamping pockets 72. Absent the presence of the second portions 82a, 82b, the clamping pockets 72 would be too large to provide effective clamping of the relatively small cables routed through the minor cable ports 46a, 46b. Thus, the second portions 82a, 82b are configured to fill excess void space within the clamping pockets 72 so that the relatively small cables routed through the minor cable ports 46a, 46b can be effectively clamped at the cable anchoring stations 38. In certain examples, the second portions 82a, 82b of the port size reducer plugs 42a, 42b can be generally cylindrical in shape and can be unitarily formed with the first portions 80a, 80b adjacent the minor ends 86 of the truncated conical shapes defined by the first portions 80a, 80b. The second portions 82a, 82b are configured to generally fill the clamping pockets 72 and are depicted having open sides 92. The open sides 92 allow the clamping elements 68 to directly contact cables routed through the port size reducer plugs 42a, 42b so as to provide direct clamping force upon the jackets of the cables routed through the port size reducer plugs 42a, 42b.

Referring again to FIG. 4A, the blind plugs 48a, 48b are configured to fit within the minor cable ports 46a, 46b. The blind plugs 48a, 48b are configured to effectively seal the minor cable ports 46a, 46b when the cable ports 46a, 46b are not occupied by cables. The blind plugs 48a, 48b are also configured to assist in providing effective clamping at the cable anchoring stations 38. The blind plugs 48a have elongated transverse cross-sectional shapes that correspond to the shapes of the minor cable ports 46a, and the blind plugs 48b have round transverse cross-sectional shapes that correspond to the shapes of the minor cable ports 46b.

Each of the blind plugs 48a, 48b has an elongated construction having an outer end with a handle 100a, 100b. Each of the blind plugs 48a, 48b also includes a first extent 102a, 102b that coincides with the first portion 80a, 80b of the port reducing plug 42a, 42b, and a second extent 104a, 104b that coincides with the second portion 82a, 82b of the port size reducer plug 42a, 42b. The first extents 102a, 102b fill the minor cable ports 46a, 46b at the first portions 80a, 80b so as to effectively seal and close the minor cable ports 46a, 46b when the minor cable ports 46a, 46b are not in use. The second extents 104a, 104b effectively fill the minor cable ports 46a, 46b at the second portions 82a, 82b of the port reducing plugs 42a, 42b so as to limit void space within the second portions 82a, 82b so that the second portions 82a, 82b do not excessively deform during clamping. For example, if one of the minor cable ports 46a, 46b of a given port size reducer plug 42a, 42b were occupied with a cable while the other minor cable port 46a, 46b of the port size reducer plug 42a, 42b were to be unoccupied at the second portion 82a, 82b, the unoccupied minor cable port 46a, 46b would allow the second portion 82a, 82b to deform a substantial amount during clamping thereby preventing sufficient clamping force from being applied to the cable routed through the other minor cable port 46a, 46b.

The blind plugs 48a, 48b can also include first retention shoulders 106a, 106b positioned adjacent the handles 100a, 100b and second retention shoulders 108a, 108b positioned between the first extents 102a, 102b and the second extents 104a, 104b. The first retention shoulders 106a, 106b and the second retention shoulders 108a, 108b provide for effective axial retention of the blind plugs 48a, 48b within their corresponding minor cable ports 46a, 46b.

Figure 37A:
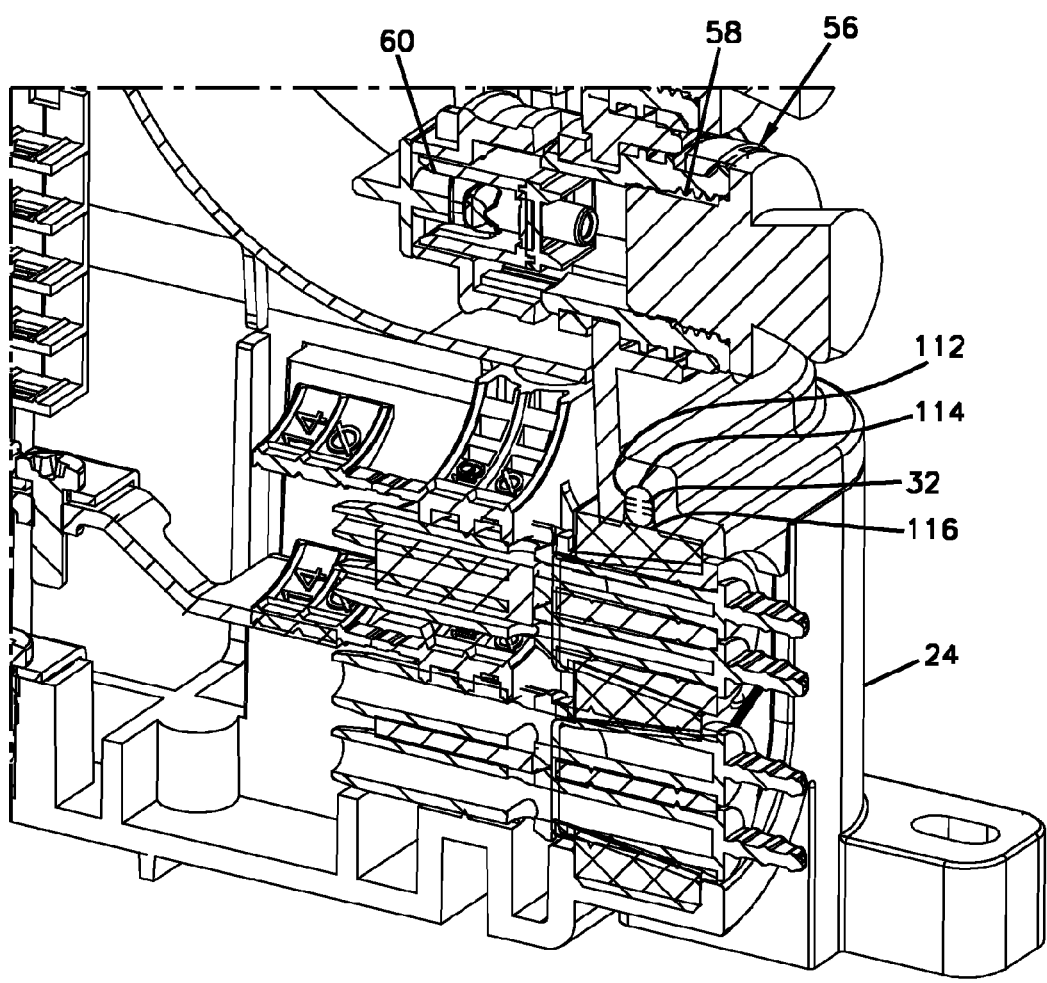
FIG. 37A is an enlarged, detailed view of a portion of FIG. 37.
Figure 39:
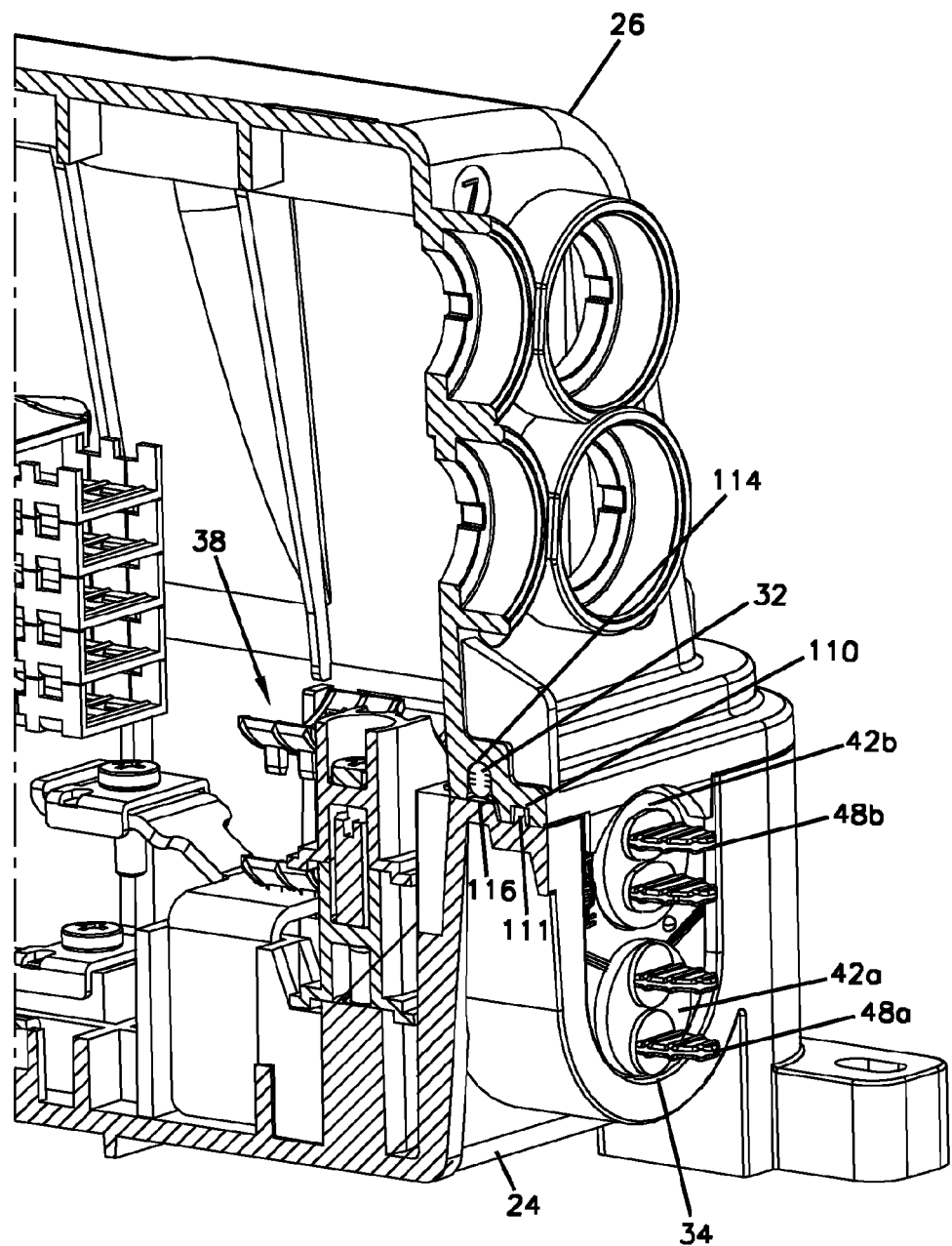
FIG. 39 is a perspective, cross-sectional view taken through the enclosure of FIG. 1.

The gasket 32 of the enclosure 20 is adapted to provide a perimeter seal at the interface between the first and second housing pieces 24, 26. In certain examples, the first and second housing pieces can have a mating relationship at the interface location 30. For example, as shown at FIG. 39, the second housing piece 26 can include channels 110 at the ends of the housing that receive rails 111 of the first housing piece 24 such that the second housing piece 26 nests over the first housing piece 24 to provide effective mating and alignment between the first and second housing pieces 24, 26. The second housing piece 26 can also include a lip that overhangs the first housing piece 24 along the major sides of the enclosure 20. The interface location 30 also includes gasket engagement and compression surfaces for causing compression of the gasket 32 when the first and second housing pieces 24, 26 are mated and clamped together. As shown at FIGS. 37 and 37A, the second housing piece 26 defines a channel 112 in which the gasket 32 is received. The channel 112 includes a gasket engagement surface 114 that opposes a corresponding gasket engagement surface 116 of the first housing piece 24. When the first and second housing pieces 24, 26 are clamped together, the gasket 32 is compressed between the gasket engagement surfaces 114, 116. Prior to compression, the gasket 32 has a height H that is larger than the depth of the channel 112.

Figure 40:
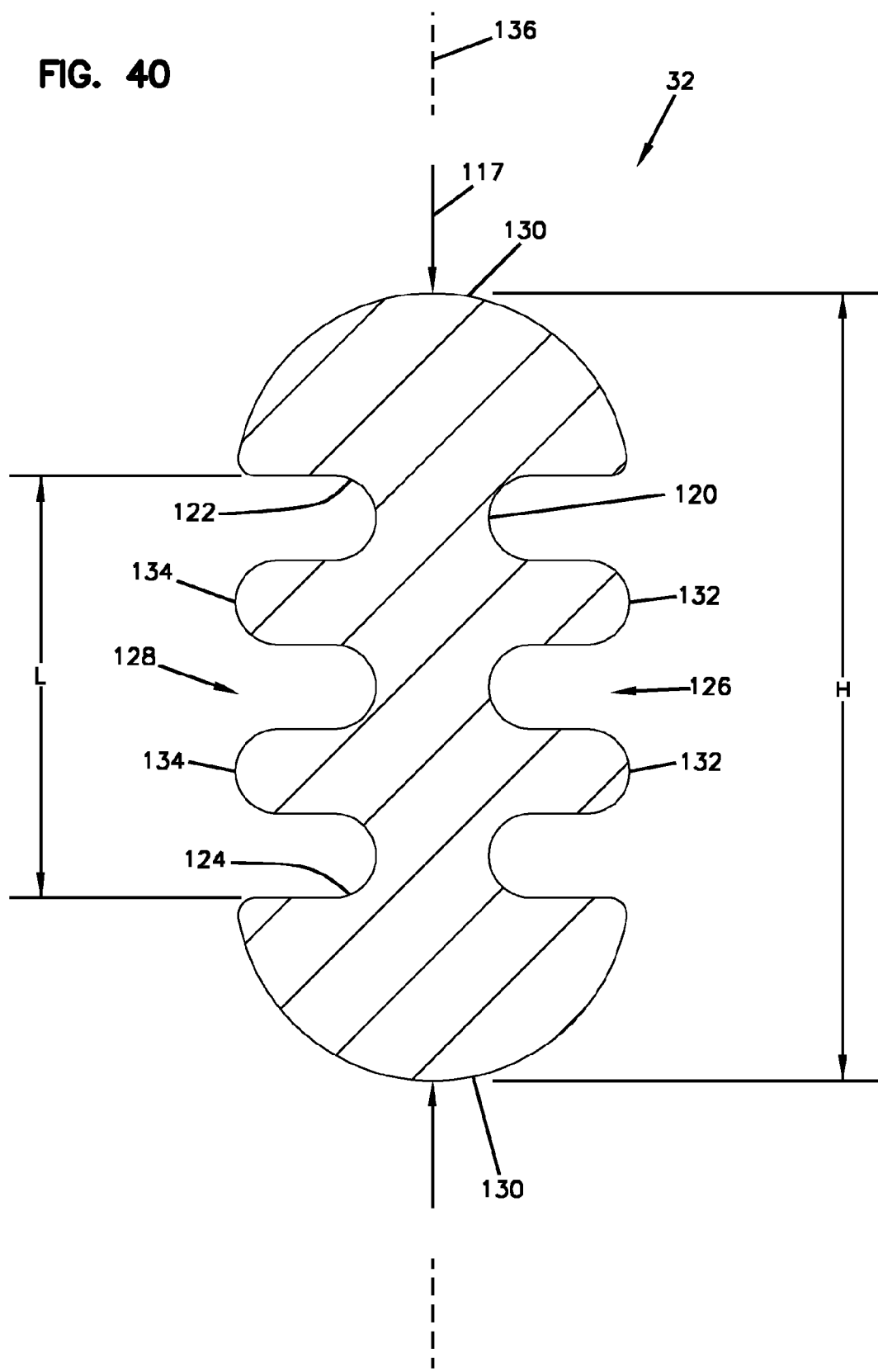
FIG. 40 is a transverse cross-sectional view of a perimeter seal of the enclosure of FIG. 1 taken along section line 40-40 of FIG. 3.

Referring to FIG. 40, the gasket 32 has a transverse cross-sectional shape including a web 120 having a length L that extends between first and second ends 122, 124 of the web 120. The web 120 includes first and second sides 126, 128 that extend along the length L between the first and second ends 122, 124. The transverse cross-sectional shape has enlarged heads 130 at the first and second ends 122, 124. The transverse cross-sectional shape also has first ribs 132 that project outwardly from the first side 126 of the web 120 at a location between the enlarged heads 130, and second ribs 134 that project outwardly from the second side 128 of the web 120 at a location between the enlarged heads 130. The first and second ribs 132, 134 are arranged generally perpendicular with respect to the web 120. When the gasket 32 is compressed between the gasket engagement surfaces 114, 116 of the first and second housing pieces 24, 26, the gasket 32 is compressed in an orientation parallel to the length L of the web 120 such that the web 120 is axially compressed along its length. In this way, the gasket 32 is compressed in an orientation that is perpendicular relative to the first and second ribs 132, 134 and parallel to the web 120. Thus, during compression, the enlarged heads 130 are compressed toward one another. In one example, the transverse cross-sectional shape of the gasket is symmetric about an axis 136 that is parallel to the length L of the web 120 and that bisects the web 120. The configuration of the transverse cross-sectional shape of the gasket 32 assists in providing effective perimeter sealing of the housing 22 without requiring excessive clamping forces. In other examples, the transverse cross-sectional profile of the gasket can have a single first rib that projects from the first side of the web and a single second rib which projects from the opposite second side of the web. In other examples, other gasket profiles can be used.

In certain examples, the transverse cross-sectional profile of the gasket 32 is compressed at least 1 millimeter or at least 1.5 millimeters along the length of the web. In certain examples, the transverse cross-sectional profile of the gasket 32 is compressed at least 15, 20 or 25 percent along the length of the web from a non-compressed state to a compressed state when the housing pieces are latched together. In certain examples, the transverse cross-sectional profile of the gasket 32 is compressed at least 15-25 percent along the length of the web from a non-compressed state to a compressed state when the housing pieces are latched together. In certain examples, the gasket can have a Shore A hardness in the range of 20-60. In certain examples, the gasket can have a profile height in the range of 5-10 millimeters or in the range of 6-9 millimeters.

Figure 41:
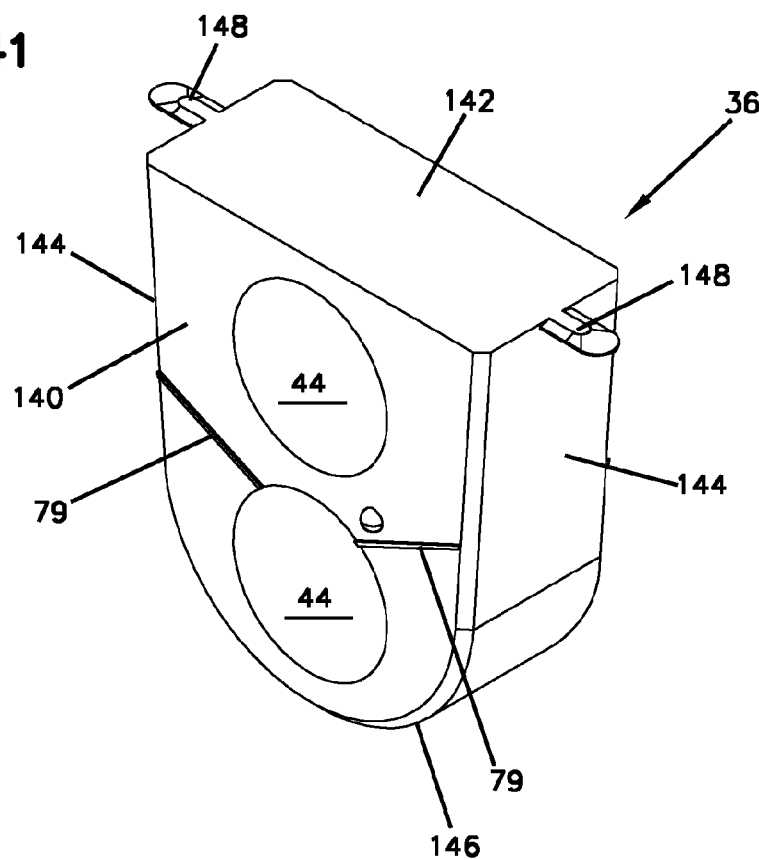
FIG. 41 is a perspective view of a cable seal in accordance with the principles of the present disclosure.
Figure 42:
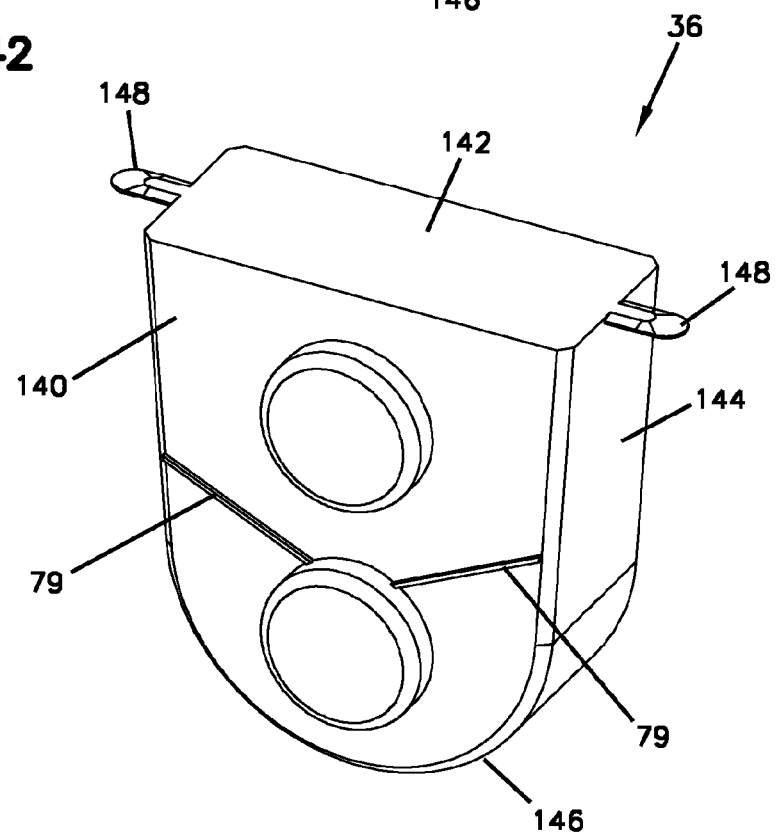
FIG. 42 is another perspective view of the cable seal of FIG. 41.

Referring to FIGS. 41 and 42, the cable seals 36 each include a main body 140 that defines the major cable ports 44. The main body 140 includes a generally flat top peripheral surface 142, generally flat side peripheral side surfaces 144, and a rounded bottom peripheral surface 146. The cable seal 36 also includes structure for providing enhanced triple point sealing. For example, the cable seal 36 includes sealing tabs 148 that project outwardly from the side peripheral surfaces 144 of the main body 140 adjacent the peripheral surface 142 of the main body 140. In certain examples, the tabs can be tapered along their lengths so as to narrow as the tabs extend away from the main body of the cable seal. In certain examples, the tabs are at a top end of the cable seal.

Figure 43A:
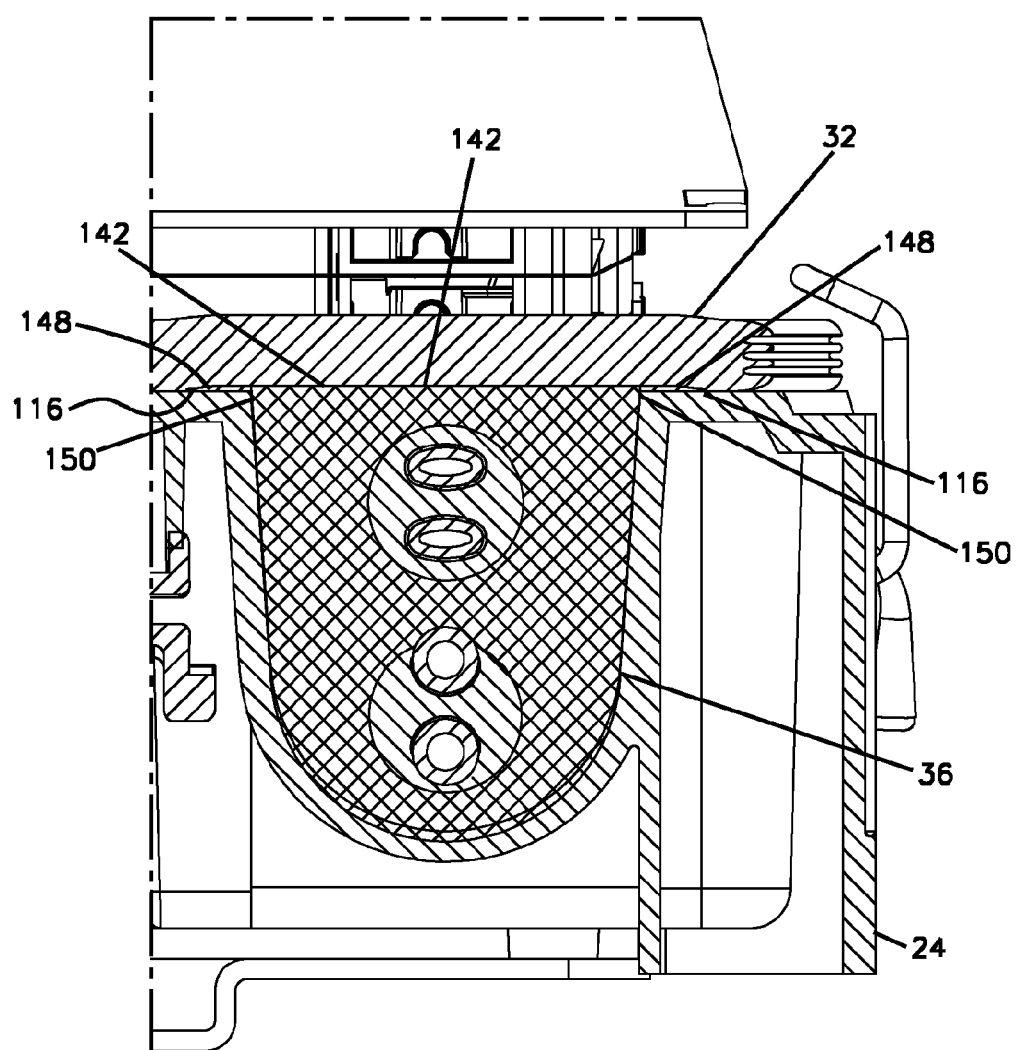
FIG. 43A shows the cable seal of FIGS. 41 and 42 in a non-compressed configuration positioned within a cable seal opening of the base of FIG. 2.
Figure 43B:
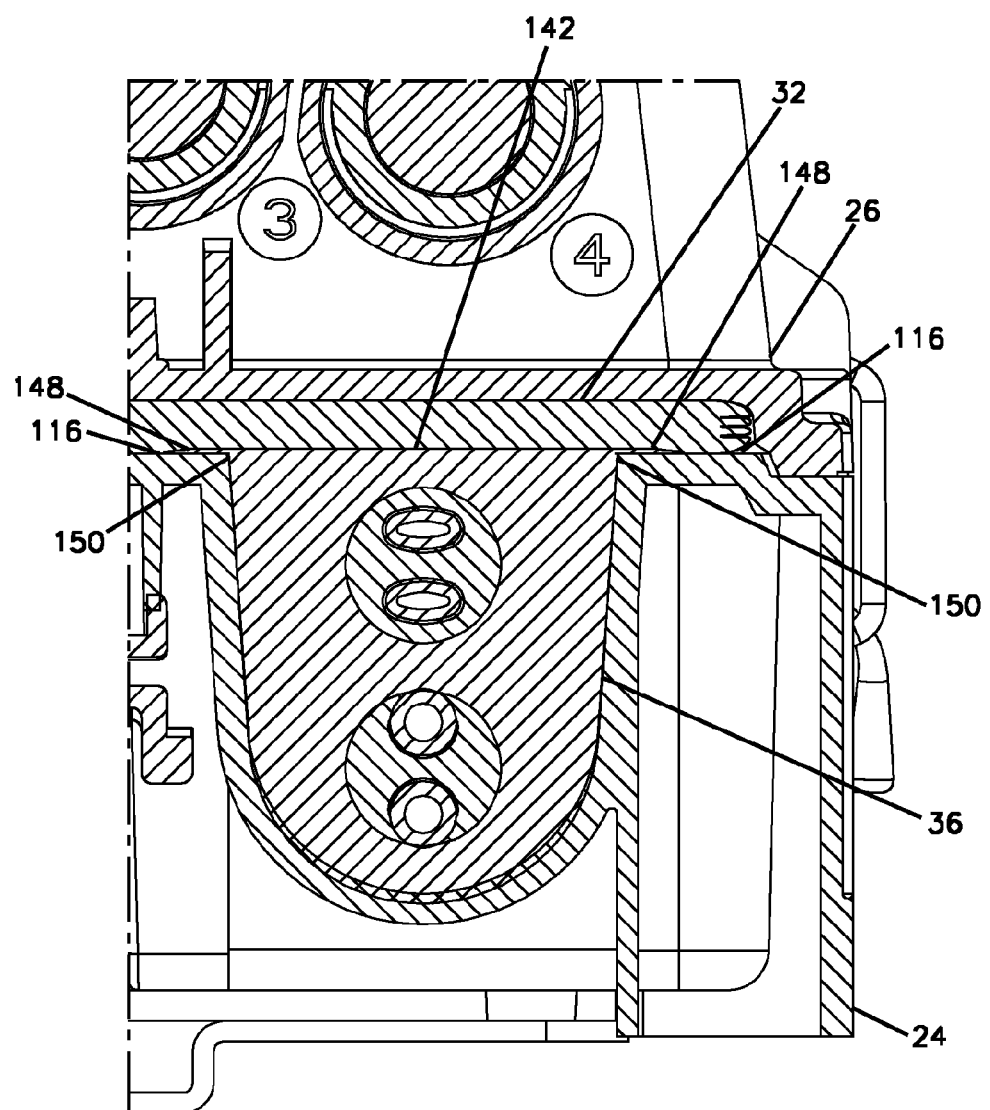
FIG. 43B shows the cable seal of FIGS. 41 and 42 in a compressed orientation between the base and the cover of the enclosure of FIG. 1.
Figure 44:
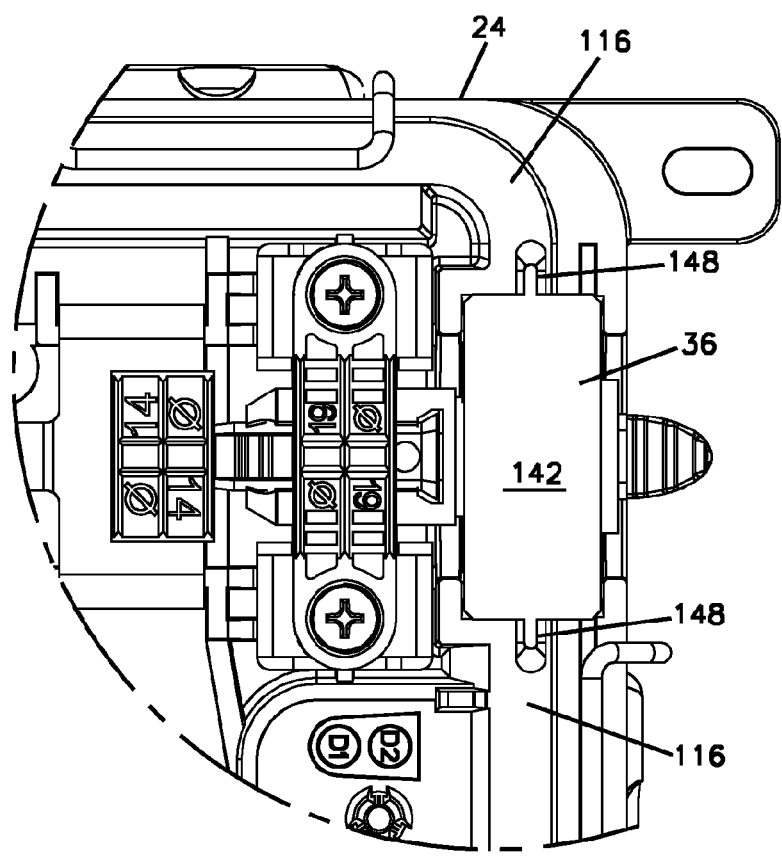
FIG. 44 is a top view showing the cable seal of FIGS. 41 and 42 in the cable seal opening with no gasket in place over the cable seal.
Figure 45:
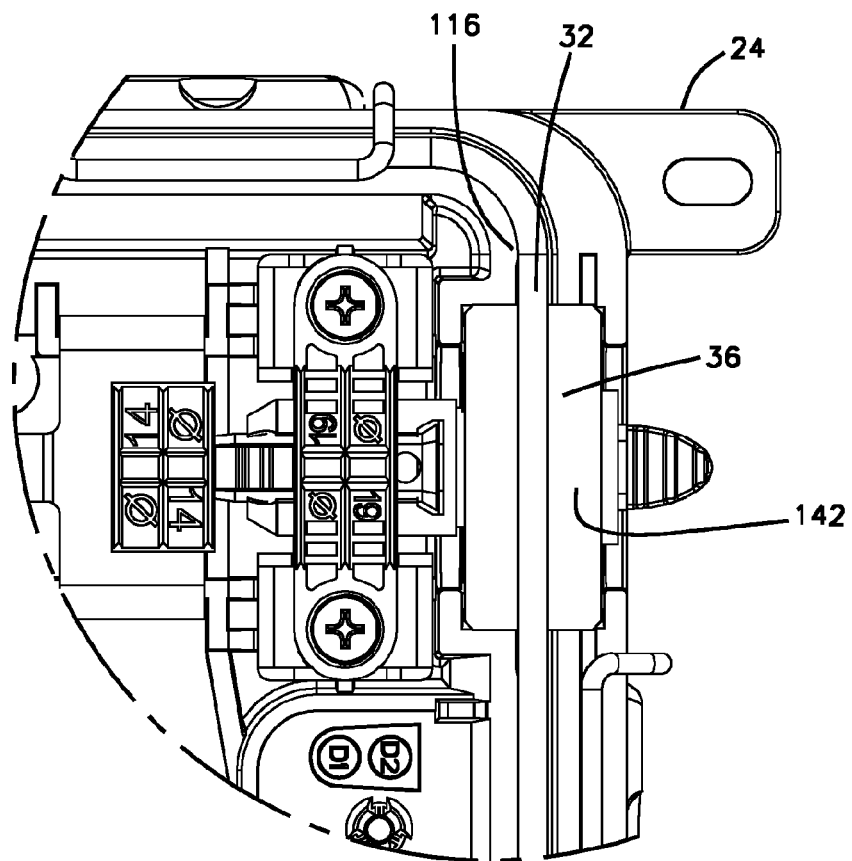
FIG. 45 is a top view showing the cable seal of FIGS. 41 and 42 mounted within the cable seal opening with the perimeter gasket shown extending across a top peripheral surface of the cable sealing member.
Figure 46:
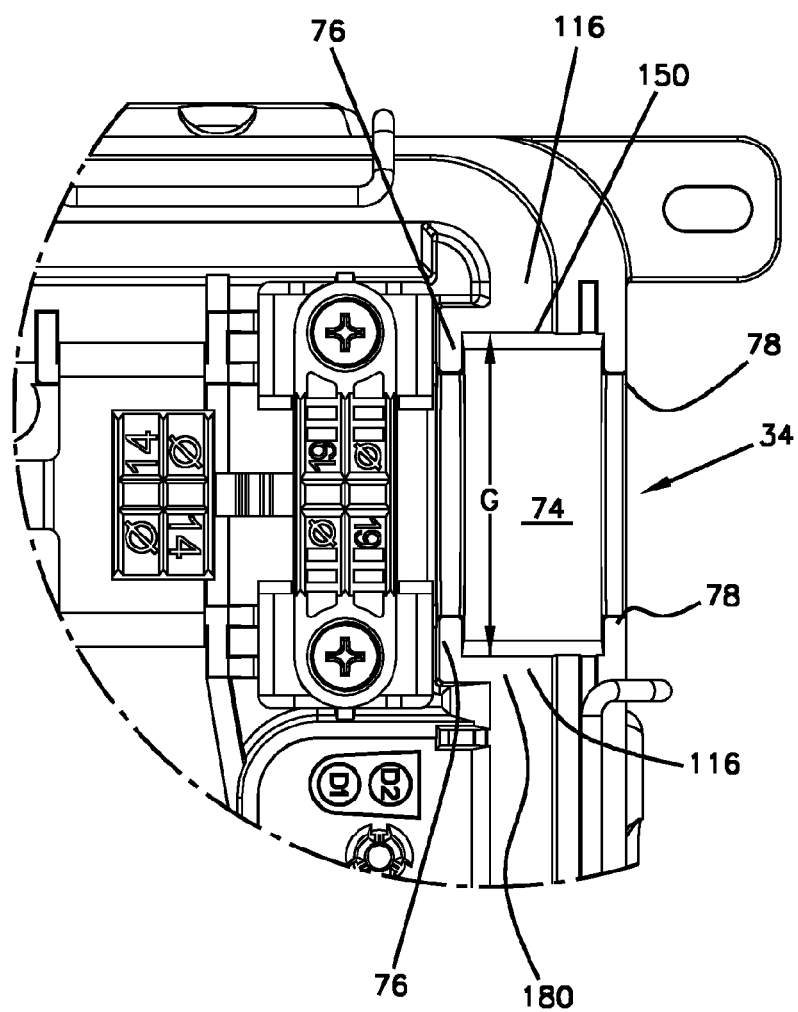
FIG. 46 is a top view showing the cable seal opening of the base of FIG. 2 with no cable seal mounted therein.
Figure 49A:
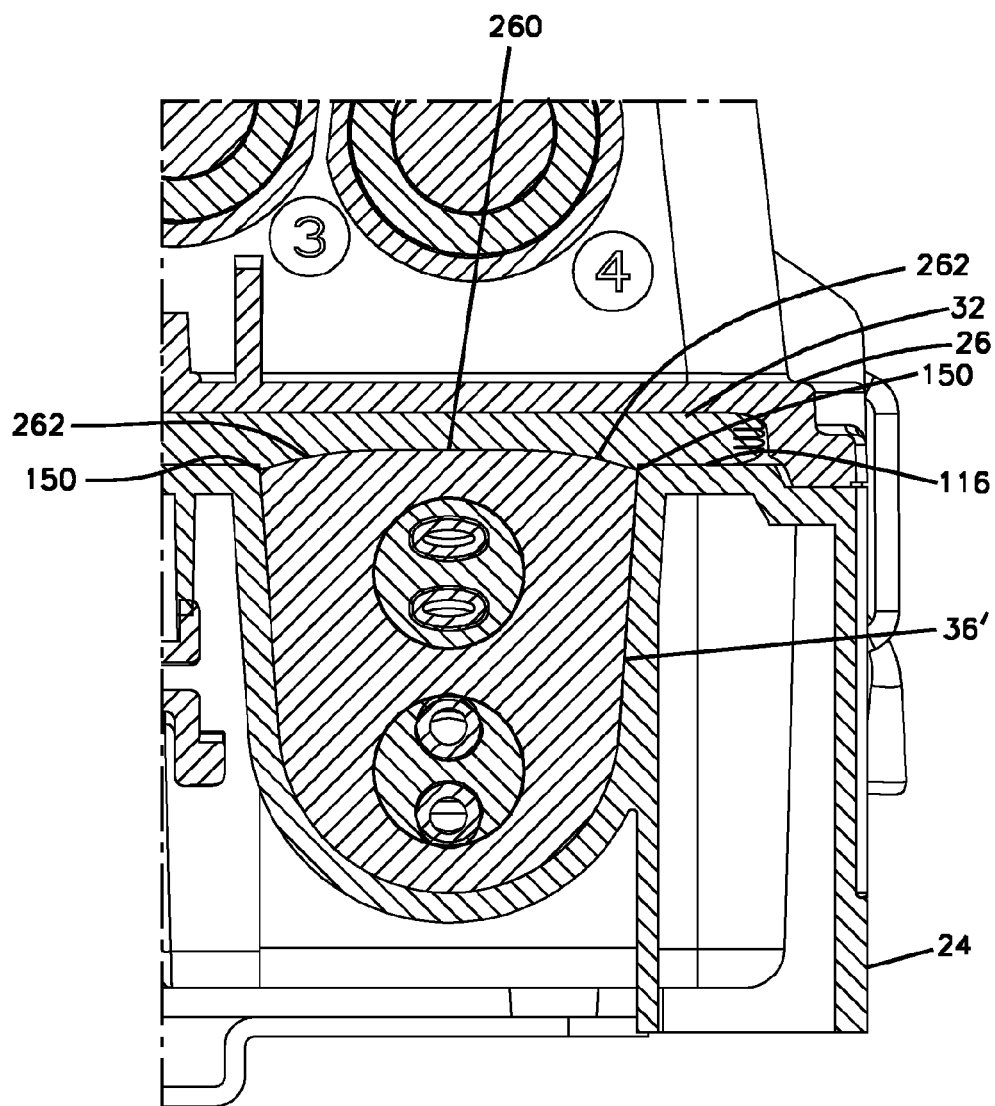
FIG. 49A shows the cable seal of FIGS. 47 and 48 mounted within the cable seal opening of the base of FIG. 2, the cable seal is shown in a non-compressed orientation.
Figure 49B:
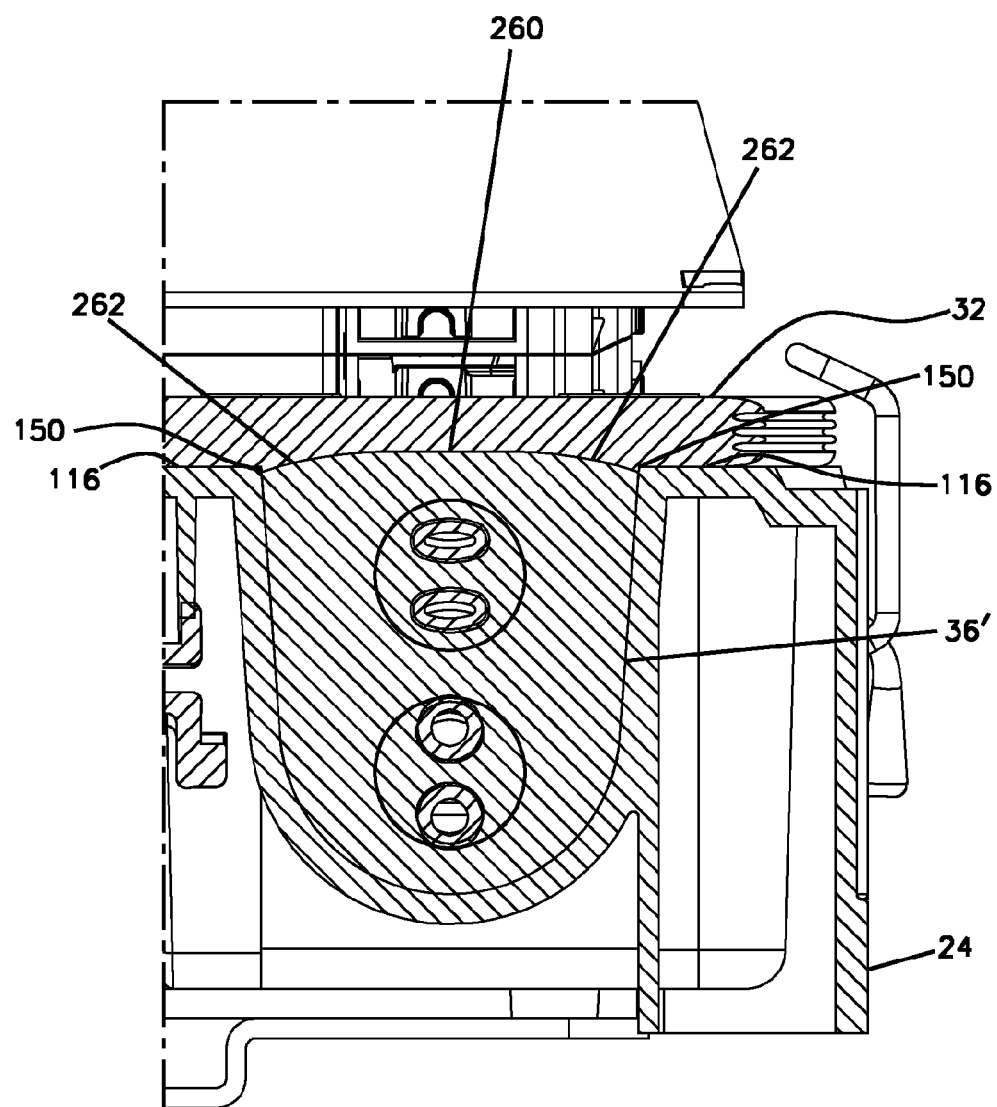
FIG. 49B shows the cable seal of FIGS. 47 and 48 in a compressed orientation within the cable seal opening of the base of FIG. 2.
Figure 50:
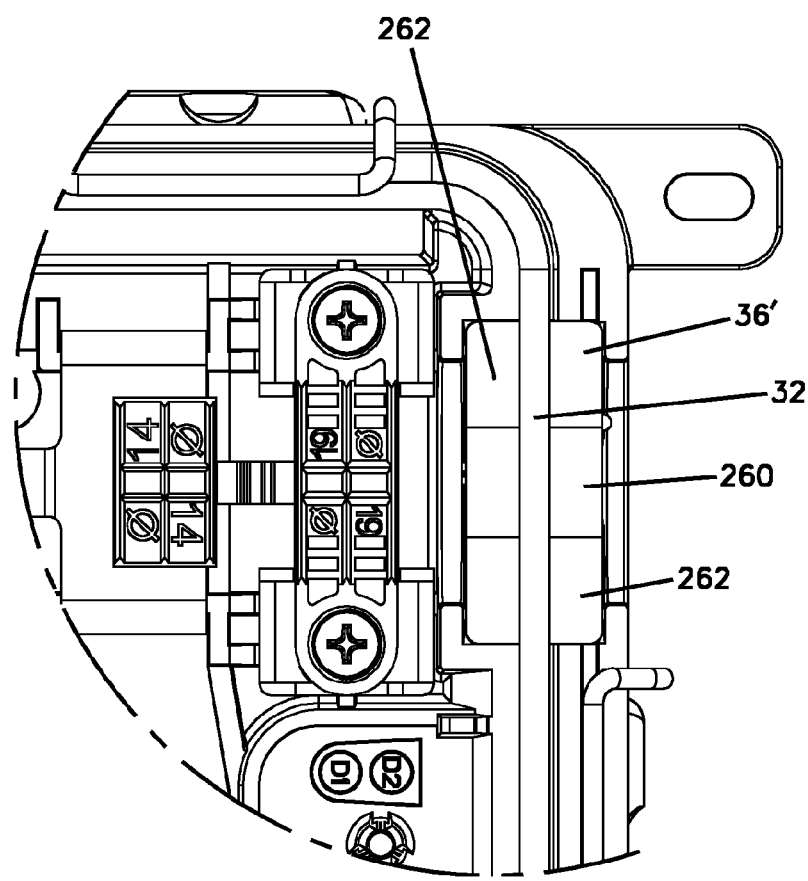
FIG. 50 is a top view showing the cable seal of FIGS. 47 and 48 mounted within the cable seal opening of the base of FIG. 2 without a gasket extending across the top of the cable seal.
Figure 51:
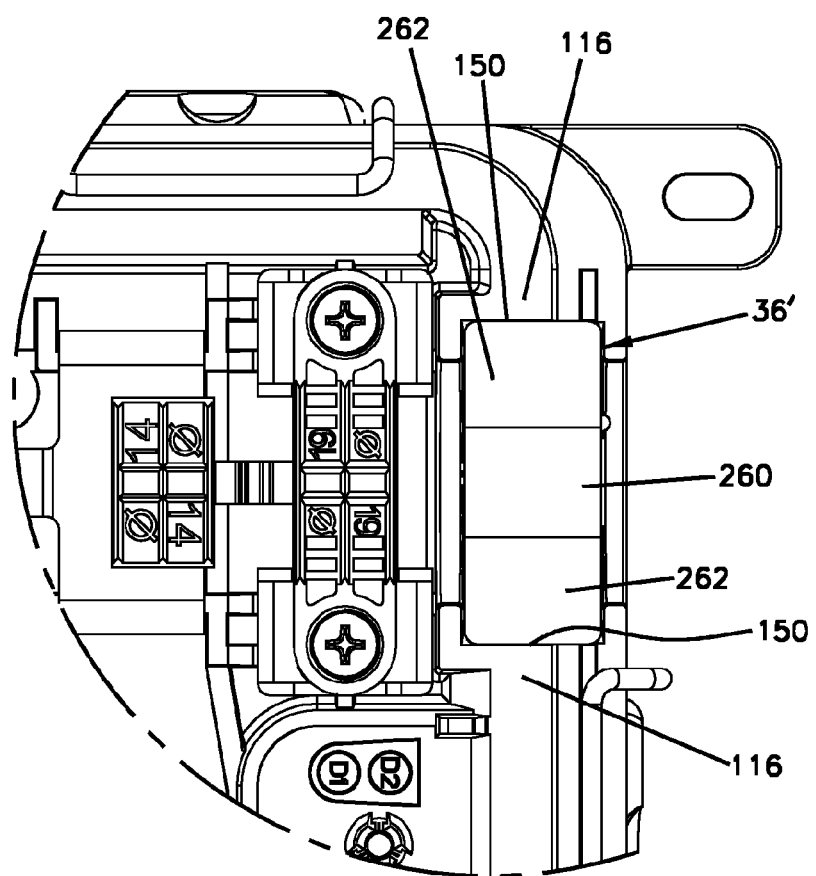
FIG. 51 is a top view showing the cable seal of FIGS. 47 and 48 mounted within the cable seal opening of the base of FIG. 2 with the perimeter gasket shown extending across the top of the cable seal.

FIGS. 43A and 43B show one of the cable seals 36 mounted within one of the cable seal openings 34. As shown at FIGS. 44-46, the gasket engagement surface 116 of the first housing piece 24 has gap-defining edges 150 that define a gap G in the engagement surface 116 at the cable seal opening 34. As shown at FIGS. 43A, 43B, 44 and 45, the top peripheral surface 142 of the cable seal 36 is configured to bridge the gap G between the gap defining edges 150 of the gasket engagement surface 116. As shown at FIG. 45, the gasket 32 extends across the top peripheral surface 142 of the cable seal 36 and across the gap-defining edges 150 of the gasket engagement surface 116. The sealing tabs 148 of the cable seal 36 extend from the main body 140 of the cable seal 36 across the gap-defining edges 150 and are positioned between the gasket 32 and the gasket engagement surface 116 so as to provide enhanced sealing at the triple point location associated with the gap-defining edges 150.

FIGS. 47 and 48 show another cable seal 36' that can be mounted at the cable seal openings 34 of the enclosure 20. The cable seal 36' has an alternative configuration for providing enhanced sealing at triple point locations. The cable seal 36' has a main body 240 including a top peripheral surface 242, side peripheral surfaces 244 and a rounded bottom peripheral surface 246. The main body 240 defines major cable ports 44. When the cable seal 36' is mounted within the cable seal opening 34, the top peripheral surface 242 is positioned at the interface location 30 between the first and second housing pieces 24, 26. The top peripheral surface 242 of the cable seal 36' bridges the gap G between the gap-defining edges 150 of the gasket engagement surface 116 of the first housing piece 24. The gasket 32 extends across the top peripheral surface 242 and across the gap-defining edges 150 of the gasket engagement surface 116. The top peripheral surface 242 of the cable seal 36' includes an intermediate portion 260 that is raised relative to the gasket engagement surface 116 prior to compression of the cable seal 36' between the first and second housing pieces 24, 26. The top peripheral surface 242 of the cable seal 36' also includes outer chamfer portions 262 on opposite sides of the intermediate portion 260 that ramp downwardly from the intermediate portion 260 toward the gap-defining edges 150 of the gasket engagement surface 116 of the first housing piece 24. In this way, the chamfer portions 262 provide a smooth transition between the seal and the gasket engagement surface 116 to avoid an open space at the triple point. FIGS. 49A, 49B, 50 and 51 show the cable seal 36' mounted within the cable seal opening 34.

The various examples described above are provided by way of illustration only and are not to be construed to limit the scope of the present disclosure. Those skilled in the art will readily recognize various modifications and changes that may be made without departing from the true spirit and scope of the present disclosure. From the foregoing detailed description, it will be evident that modifications and variations can be made without departing from the spirit and scope of the disclosure.

LIST OF REFERENCE NUMERALS AND CORRESPONDING FEATURES 20 enclosure
22 housing
24 first housing piece
26 second housing piece
30 interface location
32 gasket
34 cable seal opening
36 cable seal
36' cable seal
38 cable anchoring station
40 cable clamping location
42a port size reducer plug
42b port size reducer plug
44 major cable ports
46a minor cable ports
46b minor cable ports
48a blind plug
48b blind plug
50 hinge
52 clamping latches
54 fiber management trays
56 ruggedized fiber optic adapters
58 exterior ports
60 interior ports
62 dust plugs
64 connectorized ends
66 connectorized pigtails
68 clamping elements
68a lower clamping elements
68b intermediate clamping elements
68c upper clamping elements
70 bolts
72 clamping pockets
74 seal retention pockets
76 inner flanges
78 outer flanges
79 tear locations
80a first portion
80b first portion
82a second portion
82b second portion
84 major end
86 minor end
88 first retention shoulder
90 second retention shoulder
92 open side
100a handle
100b handle
102a first extent
102b first extent
104a second extent
104b second extent
106a first retention shoulder
106b first retention shoulder
108a second retention shoulder
108b second retention shoulder
110 channel
111 rail
112 channel
114 gasket engagement surface
116 engagement surface
120 web
122 first end
124 second end
126 first side
128 second side
130 enlarged heads
132 first rib
134 second rib
136 axis
140 main body
142 top peripheral surface
144 side peripheral surfaces
146 rounded bottom peripheral surface
148 sealing tabs
150 gap-defining edges
240 main body
242 top peripheral surface
244 side peripheral surfaces
246 rounded bottom peripheral surface
260 intermediate portion
262 outer chamfer portions

What is claimed is:

1. An enclosure for use in a fiber optic distribution network, the enclosure comprising:
a housing including first and second housing pieces configured to be coupled together to define a housing interior, the first and second housing pieces interfacing at an interface location that extends about a perimeter of the housing;
a gasket for providing a perimeter seal between the first housing piece and the second housing piece, the gasket being positioned between the first and second housing pieces at the interface location;
the gasket having a transverse cross-sectional shape including a web having a length that extends between first and second ends, the web including first and second sides that extend along the length between the first and second ends, the transverse cross-sectional shape having enlarged heads at the first and second ends, the enlarged heads each have a dome shape that projects outwardly from the first and second sides of the web, the transverse cross-sectional shape having at least one first rib that projects outwardly from the first side of the web at a location between the enlarged heads and at least one second rib that projects outwardly from the second side of the web at a location between the enlarged heads, and the gasket being compressed between the first and second housing pieces in a compression orientation parallel to the length of the web such that the web is axially compressed along its length.

2. The enclosure of claim 1, wherein the first and second ribs are perpendicular to the compression orientation.

3. The enclosure of claim 1, wherein the transverse cross-sectional shape of the gasket is symmetrical about an axis that is parallel to the length of the web and that bisects the web.

4. The enclosure of claim 1, wherein the first rib is one of a plurality of first ribs that project outwardly from the first side of the web, and wherein the second rib is one of a plurality of second ribs that project outwardly from the second side of the web.

5. The enclosure of claim 4, wherein the first ribs are spaced apart along the length of the web and are parallel to one another, and wherein the second ribs are spaced apart along the length of the web and are parallel to one another.

6. The enclosure of claim 1, wherein a transverse width of the gasket is decreased between the enlarged heads and the first and second ribs.

7. The enclosure of claim 1, wherein the web defines a series of symmetrical gaps between the enlarged heads and the first and second ribs.

8. The enclosure of claim 1, wherein the enlarged heads each define a rounded surface at a distal end and a planar surface at a proximal end.

9. The enclosure of claim 8, wherein the planar surfaces of the enlarged heads are orthogonal to the first and second sides of the web.

10. The enclosure of claim 8, wherein the planar surfaces of the enlarged heads are parallel to the first and second ribs.

11. The enclosure of claim 1, wherein the web includes a pair of first ribs that project outwardly from the first side of the web and a pair of second ribs that project outwardly from the second side of the web, and wherein the pair of first ribs and the pair of second ribs are parallel to proximal ends of the enlarged heads.

12. The enclosure of claim 1, wherein the first and second housing pieces respectively define opposing first and second gasket engagement surfaces at the interface location, wherein the first gasket engagement surface includes gap-defining edges that define a gap in the first gasket engagement surface at a cable seal opening; and wherein the gasket extends across a peripheral surface of a cable seal in the cable seal opening and across the gap-defining edges of the first gasket engagement surface and is compressed between the opposing first and second gasket engagement surfaces.

* * * * *